(12) United States Patent
Kapoor et al.

(10) Patent No.: US 7,395,091 B2
(45) Date of Patent: Jul. 1, 2008

(54) SYSTEMS AND METHODS FOR RECEIVER UPGRADE

(75) Inventors: Sunil Kapoor, Goleta, CA (US); Ashok Burton Tripathi, Santa Barbara, CA (US); Gregory Lynton Hey-Shipton, Santa Barbara, CA (US); Gena Marie Yates, Santa Barbara, CA (US); Edward Robert Soares, Lompoc, CA (US)

(73) Assignee: Superconductor Technologies, Inc., Santa Barbara, CA (US)

( * ) Notice: Subject to any disclaimer, the term of this patent is extended or adjusted under 35 U.S.C. 154(b) by 276 days.

(21) Appl. No.: 10/946,309

(22) Filed: Sep. 22, 2004

(65) Prior Publication Data

US 2005/0208912 A1   Sep. 22, 2005

Related U.S. Application Data

(63) Continuation-in-part of application No. 10/803,969, filed on Mar. 19, 2004.

(51) Int. Cl.
  *H04M 1/00* (2006.01)
  *H04B 1/38* (2006.01)
(52) U.S. Cl. .................... 455/560; 455/561; 455/562.1
(58) Field of Classification Search ................. 455/561, 455/562.1, 73, 560, 130, 140; 62/6, 51.1; 330/256
See application file for complete search history.

(56) References Cited

U.S. PATENT DOCUMENTS

| | | | | |
|---|---|---|---|---|
| 5,488,382 A | | 1/1996 | Fenzi et al. ............. 343/700 R |
| 5,616,538 A | | 4/1997 | Hey-Shipton et al. ....... 505/210 |
| 5,806,948 A | * | 9/1998 | Rowan et al. ............ 312/293.3 |
| 5,879,173 A | * | 3/1999 | Poplawski et al. .......... 439/138 |
| 5,886,986 A | * | 3/1999 | Lee et al. ..................... 370/276 |
| 6,067,583 A | * | 5/2000 | Gilbert ......................... 710/8 |
| 6,104,934 A | * | 8/2000 | Patton et al. ................ 455/561 |
| 6,205,340 B1 | * | 3/2001 | Yandrofski et al. .......... 455/561 |
| 6,208,221 B1 | * | 3/2001 | Pelz et al. .................... 333/126 |
| 6,212,404 B1 | * | 4/2001 | Hershtig ..................... 455/561 |
| 6,263,215 B1 | | 7/2001 | Patton et al. ................ 455/561 |
| 6,424,846 B1 | | 7/2002 | Cortes et al. ................ 505/210 |
| 6,462,949 B1 | | 10/2002 | Parish et al. ................ 361/699 |
| 6,501,353 B2 | * | 12/2002 | Abdelmonem et al. ..... 333/99 S |
| 6,584,303 B1 | | 6/2003 | Kingswood et al. ........... 455/73 |
| 6,686,811 B2 | | 2/2004 | Hey-Shipton ............. 333/99 S |
| 6,711,912 B2 | * | 3/2004 | Laubacher et al. ......... 62/259.2 |

(Continued)

*Primary Examiner*—Sonny Trinh
(74) *Attorney, Agent, or Firm*—Wolff Law Offices, PLLC; Kevin Alan Wolff

(57) ABSTRACT

Systems and methods for an upgradeable and/or reconfigurable receiver are provided. In general, the present invention is directed to providing systems and methods for designing an electronic communication system having easy and cost effective upgradeable receiver systems and components including, for example, an amplifier and/or a filter. For example, a receiver may include a receiver front end that is configured so that at least one of the original conventional system components may be used along with one or more new system components to provide greater receiver sensitivity and/or selectivity. In various embodiments, portions of an upgradeable receiver system may be made as modular components that allow easy replacement for the upgradeable components which may include a signal amplifier and/or a signal filter. In various embodiments the receiver may be upgraded by replacing a conventional low noise amplifier (LNA) with a high temperature superconductor (HTS) filter and/or a cryo-cooled LNA.

21 Claims, 19 Drawing Sheets

U.S. PATENT DOCUMENTS

| | | | |
|---|---|---|---|
| 6,959,206 B2* | 10/2005 | Abdelmonem et al. | 455/561 |
| 2002/0132591 A1* | 9/2002 | Abdelmonem et al. | 455/78 |
| 2002/0151331 A1* | 10/2002 | Abdelmonem et al. | 455/561 |
| 2002/0151332 A1* | 10/2002 | Eddy | 455/561 |
| 2002/0173341 A1* | 11/2002 | Abdelmonem et al. | 455/561 |
| 2003/0148794 A1* | 8/2003 | Wilson, Jr. | 455/562 |
| 2005/0056036 A1* | 3/2005 | O'Baid et al. | 62/259.2 |

* cited by examiner

SYSTEMS AND METHODS FOR RECEIVER UPGRADE

RELATED APPLICATIONS

This application claims priority to and is a continuation-in-part of U.S. patent application Ser. No. 10/803,969, filed on Mar. 19, 2004. This prior application is hereby incorporated by reference for all purposes.

BACKGROUND OF THE INVENTION

1. Field of the Invention

The present invention relates to the field of communications and, more specifically, to methods and systems for providing electronic communications.

2. Description of the Related Art

Today there are numerous types of electronic or electronic assisted communication systems that include, for example, radio, television, cable, internet, two-way radio, cellular telephone systems, LANS, WANS, and optical communication systems. Many of these systems may employ various types of signal amplifiers and filters in their receivers that have a particular performance capability to support today's use and traffic requirements. However, these electronic communication systems will likely experience increased communication information use and traffic in the future that will require better signal amplifiers and filters beyond their present capability and the systems would thus benefit from incorporating system designs and components that are easily and cost effectively upgradeable to accommodate the additional use and traffic.

For example, to provide cost effective and reliable system deployment, wireless communication service providers often utilize signal amplifiers at the receiver front end to boost received signal. This approach improves overall receiver sensitivity and radio link margin. In addition, wireless service providers often find it advantageous to use signal filtering at the receiver front end to improve channel selectivity and noise rejection, suppress cross channel interference, and maintain a high sensitivity even in the presence of out of band interference.

Presently, wireless communication operators must choose between higher cost High Temperature Superconductor (HTS) based receiver front ends and conventional filter plus Low Noise Amplifier (LNA) products. In the presence of electromagnetic interference, low noise conventional products may not provide sufficient filtering to protect the noise floor of the base station from increasing. In such cases, the conventional receiver front end systems must be replaced with better performance systems such as, for example, an HTS based system, that provide greater sensitivity, greater selectivity, or a combination thereof. However, replacing a conventional receiver front end with a receiver front end including HTS typically results in the wasteful practice of disposing of all or most of the components and housing of the conventional receiver front end.

SUMMARY

The present invention is directed generally to providing systems and methods for designing an electronic communication system having easy and cost effective upgradeable receiver system and components including, for example, an amplifier and/or a filter. Some of the particular embodiments and variations are as follows. For example, a receiver may include a receiver front end that may be configured so that at least one or more of the original conventional system components may be used along with one or more new system components to provide greater receiver sensitivity and/or selectivity. In various embodiments, portions of an upgradeable receiver system may be made as modular components that allow easy replacement for the upgradeable components which may include a signal amplifier and/or a signal filter. In various embodiments the receiver may be upgraded by replacing a conventional low noise amplifier (LNA) with a high temperature superconductor (HTS) filter and/or a cryo-cooled LNA.

More specifically, the system may be initially constructed so that a receiver front end includes a duplexer module (e.g., a single duplexer, a dual-duplexer, etc.) and an initially installed LNA powered by a power supply. Then, when improved signal sensitivity and/or selectivity is needed, the receiver front end may be upgraded by removing the initial power supply and/or the initial LNA and coupling a new higher performance module or sub-system to the duplexer. The new higher performance module or sub-system may include, for example, a HTS filter and/or a cryo-cooled LNA. The upgraded system may also include a cooling system, a control board, a heat sink, and/or a power supply. In one embodiment, all of the newer higher performance module or sub-system may be mounted on a panel as a single assembly.

In various embodiments of the present invention, the system may include an enclosure which is configured to permit a user to upgrade from a first set of receiver front end components to a second set of front end components. The first set of components may include at least a conventional amplifier, while the second set of components may include cryogenically based HTS filtering and low-noise amplification. In at least one embodiment, the upgradeable front end may be a component of a wireless base station. In one variation, the system may include an enclosure or housing containing two sections, a first original section and a second original section. The first original section may contain primarily components that will remain after upgrade and the second original section may contain primarily components to be removed during upgrade. In one embodiment the first original section may be configured so that as a result of upgrade it will house primarily original components while an upgrade enclosure houses the upgrade components. For upgrade, the first original enclosure and the upgrade enclosure may be coupled to each other electrically and/or physically. In one variation, each of the first original enclosure and the upgrade enclosure may have open sides that are connected together to form one uniform enclosure. Of course, regardless of the enclosures configuration the two enclosures may be constructed so that they each contain some of the original components that have remained after other components are upgraded. In one variation, an original LNA may be used in conjunction with a cryo-cooled HTS filter.

Furthermore, the design of the receiver front end chassis may be modular so that minimal modifications are required to accomplish the upgrade. Thus, a user of the system, such as, for example, a wireless service provider, can preserve the capital investment in the current system and reuse a portion of the receiver front end components already purchased. For example, a modular panel such as, for example, a rear panel, may be provided to allow simple replacement of the conventional amplifier or amplifiers and the power supply and/or alarm circuit board on a first modular panel with a heat sink that has HTS and cryogenic equipment such as, for example, a HTS filter and cryo-cooled amplifier, pre-mounted on a second modular panel to accomplish the upgrade.

In one variation, a modular panel such as, for example, a rear panel, may be replaced with a connector panel that couples to a duplexer on one side and allows the original front end chassis to be coupled with, for example, RF cables, to a separate chassis having upgraded components, for example, a high temperature superconductor (HTS) and/or a cryo-cooled equipment. In one embodiment the separate chassis with upgraded components may include, for example, an HTS filter or/and a cryo-cooled amplifier to accomplish the upgrade.

In another variation, a modular portion such as, for example, a rear section of the front end chassis, may be removed and replaced with a plate that becomes the back wall of the chassis and having holes through which one or more connectors of a duplexer may be coupled with, for example, RF cables, to a separate chassis having upgraded components, for example, a high temperature superconductor (HTS) and/or a cryo-cooled equipment. In one embodiment the separate chassis with upgraded components may include, for example, an HTS filter or/and a cryo-cooled amplifier to accomplish the upgrade.

In another variation, the separate chassis may be designed to include connectors that couple to the connectors of one or more duplexers, without the need for RF cables. In a still further variation, the chassis of both the original receiver front end chassis containing a first set of components that may include a duplexer and the chassis containing a second set of components that may include cryogenically based HTS filtering and/or low-noise amplification, may be coupled together without any additional connectors such that the casing of the second separate chassis mates to the original chassis, to form one chassis, and the second separate chassis has upgraded components that may include, for example, an HTS filter or/and a cryo-cooled amplifier to accomplish the upgrade.

BRIEF DESCRIPTION OF THE DRAWINGS

The utility, objects, features and advantages of the invention will be readily appreciated and understood from consideration of the following detailed description of the embodiments of this invention, when taken with the accompanying drawings, in which same numbered elements are identical and.

DESCRIPTION OF THE PREFERRED EMBODIMENTS

Figure 1:
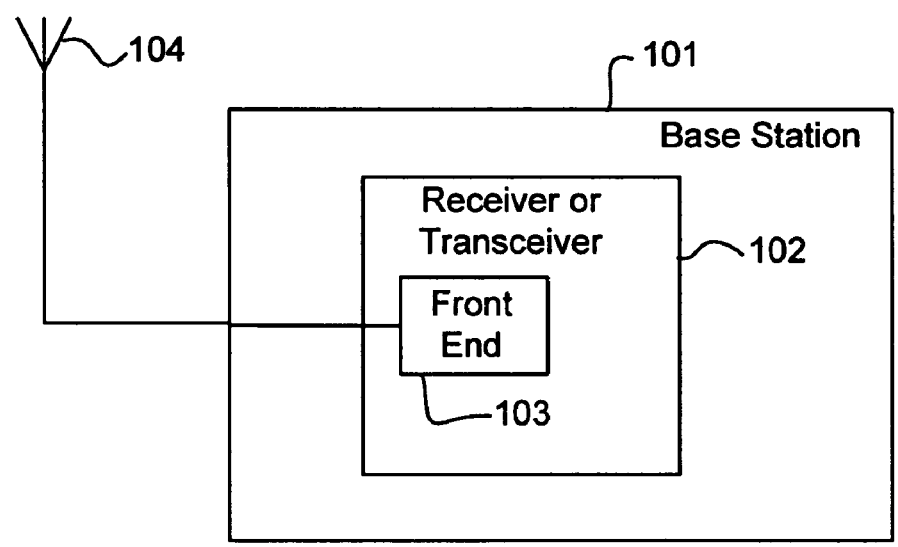
FIG. 1 is a top level system block diagram of an exemplary embodiment of a wireless communications system.

In general, the present invention is directed generally to providing systems and methods for designing an electronic communication system having easy and cost effective upgradeable receiver system and components that may include, for example, a signal amplifier and/or signal filter. More particularly, the present invention relates to systems and methods that may include a receiver front-end for wireless base stations that can be upgraded to include high temperature superconductor based filtering and/or a cryogenically cooled low noise amplifier. For example, a receiver may include a receiver front end that may be configured so that at least one or more of the original conventional system components may be used along with one or more new system components to provide greater receiver sensitivity and/or selectivity.

In various embodiments, the receiver or transceiver front-end may be designed having modularity that gives ease and convenience in manufacturing and subsequent upgrading. The front-end may be upgraded to have greater receiver sensitivity and/or selectivity. The upgraded may include, for example, superconductor based filtering. Further, the front-end may be designed so as to not require complexity in changing or re-routing connections. In some cases the upgrade may be made on site without returning the front-end equipment to a manufacturing or service building.

In one embodiment, the invention may provide for conventional low-noise amplification of duplexed or simplexed RF communication signals configured so that the device may be upgraded at a later date to provide superconductor based filtering and/or cryogenic low noise amplification to the signals. The device is designed to reuse one or more of the original conventional internal components and minimize the cost of the upgrade. In one embodiment, a housing having sufficient space to accommodate the upgrade components may be used as the housing to accommodated conventional LNA and where needed conventional duplexing components.

In another embodiment, a housing may be designed in two sections and one of the two sections may contain primarily original conventional components that will remain after upgrade, for example one or more duplexers, and the other section may include primarily the conventional components that will be removed during upgrade. In this case, the remaining housing section may be capped with a panel so as to enclose the remaining conventional components while allowing for a separate housing including the upgrade components to be electrically coupled to the remaining housing section. In one variation, another housing section containing the new components may be physically coupled to the remaining housing section so as to form a single complete enclosure, and may also provide for electrical coupling between the remaining original components and the new components for the upgrade. These embodiments provide for modular upgrading of the receiver front end. In one variation, the housing may include use of a conventional LNA coupled to a dual-duplexer for uplink enhancement without band specific filtering. In this case, the packaging may be designed so as to allow for eventual upgrade to, for example, a superconducting product which will provide sharp interference filtering and very low insertion loss.

Conceptually, a dual duplexed upgradeable receiver front end may use, for example, dual-duplexers, some cabling, chassis, and all enclosure hardware typically include in present superconductor receiver front end products. Various parts to be utilized to conform the typical present superconductor receiver front end product to a conventional receiver front end for initial system installation may include, for example, one LNA per channel, a circuit board assembly with power supply and alarm functionality for each channel, some new wiring harnesses, and a rear panel onto which a power supply board is mounted so as to form a removable module. Of course, as a result of this design approach, although the initially installed receiver front end has some conventional components and signal performance, it is configured with a removable rear panel that is easily removed and extra space that enables it to be upgraded to a system that is cryo-cooled system and may include an HTS filter and/or LNA.

At least one embodiment may be described with respect to a wireless communication system 100 as shown in FIG. 1. Referring to FIG. 1, at least one embodiment of a wireless communication system 100 may include a base station 101. In such embodiments, the base station 101 may include a receiver or transceiver 102 having a front end portion 103 and an antenna 104. Although, the front end 103 does not necessarily need to be collocated with other portions of the base station 101 electronics, and may be in various embodiments housed separately. In any case, the front end 103 may include components for conditioning the electrical characteristics of the received signal and/or transmitted signal. The received signal may be, for example, a Radio Frequency (RF) signal. For example, the received signal may be a cellular signal, Personal Communications Services (PCS) signal, GSM signal or 3G signal having frequency ranges of, for example, 824-849 MHz, 850-870 MHz, 1750 to 1990 MHz, and 2000-2100 MHz. Of course, the invention may be equally applicable to communication systems operating at other frequencies where it is desirable to, for example, improve the sensitivity and/or selectivity for a given bandwidth.

For example, the front end 103 may include one or more signal amplifying components. Further, the front end 103 may also include one or more signal filtering components. In an embodiment, the front end 103 may include different sets of components to provide particular treatment of the received signal or transmitted signal according to predetermined signal characteristics and operating parameters desired for the receiver or transceiver 102.

Figure 2A:
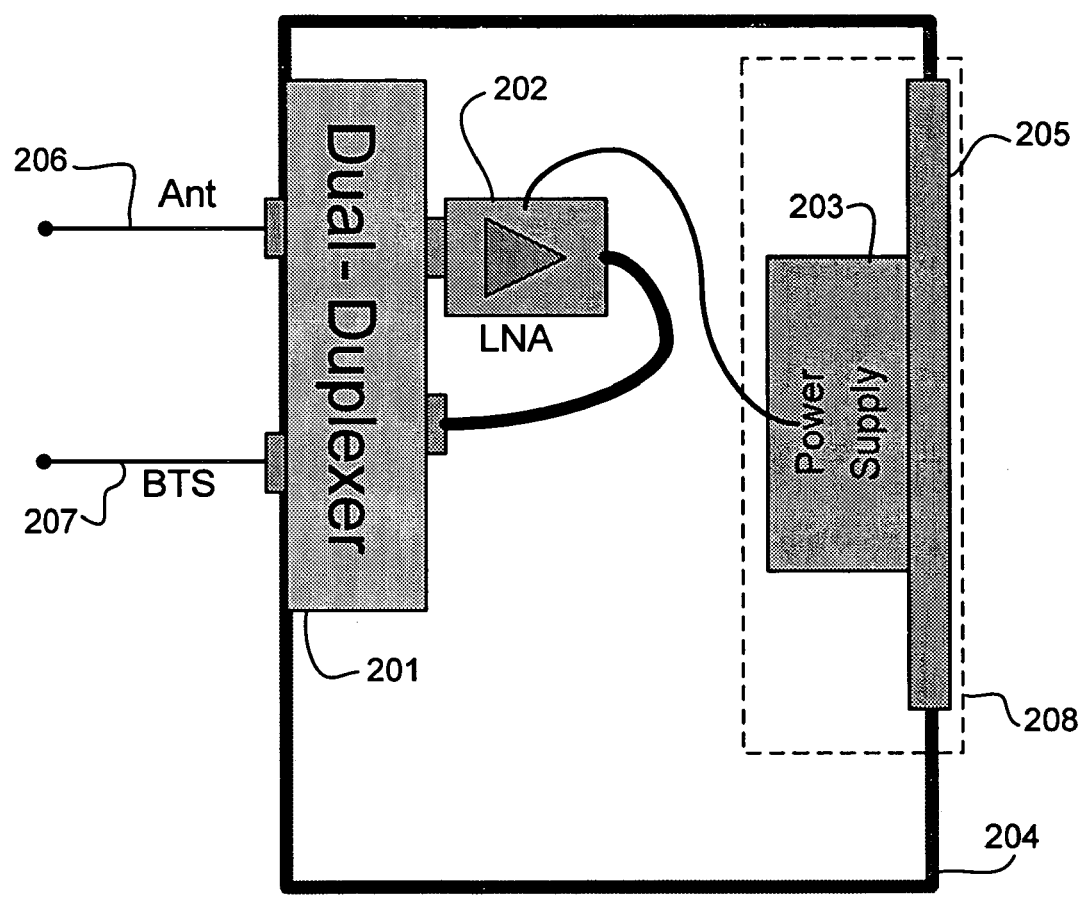
FIG. 2A is an illustration of at least one exemplary embodiment including a receiver front end having a first set of components.

An exemplary first set of front end 103 components is illustrated in FIG. 2A. The front end 103 may be comprised of various modules that make upgrading the receiver more efficient. As shown in FIG. 2A, a front end 103 having a first set of components 200 may include at least one duplexer module such as dual-duplexer 201, at least one amplifier module such as amplifier 202, and at least one power supply module 208 including power supply 203 and panel 205. The front end 103 may further include a housing 204 that supports or maintains all the modules, for example, the duplexer module 201 and power supply module 208 may be attached thereto. In one embodiment, the housing 204 is used to house all of the modular components into a single package. As shown, in this embodiment, the power supply 203 may be mounted or affixed to a mounting back panel 205. However, the power supply may be mounted elsewhere but should be easily removable, as long as the back panel 205 may be removed to allow easy introduction of updated components.

The dual-duplexer 201 may include at least one terminal 206 for receiving and/or transmitting a communication signal. In at least one embodiment, the input 206 may be coupled to a signal source, such as, for example, an antenna (not shown), a cable, etc. The dual-duplexer 201 may also include a second terminal 207. The terminal 207 may be coupled to various types of communication equipment, for example, a base station or an RF receive chain for further processing of the received and/or transmitted signal. In at least one embodiment, the terminal 207 may be coupled to the downstream receiver or transceiver components of the base station 101 such as, for example, decoding or demodulation components.

The first set of components 200 may further include a signal amplifier 202 coupled to the dual-duplexer 201. The input of the amplifier 202 may be coupled to the dual-duplexer 201 such that a communication signal received by the dual-duplexer 201 via terminal 206 is presented to the input of the amplifier 202. The output of the amplifier 202 may be coupled to the dual-duplexer 201 such that the output of the amplifier 202 is presented from the dual-duplexer via terminal 207. In an embodiment, one amplifier 202 may be provided for each channel provided by the front end 103. Another embodiment may include multiple channels, for example six channels, in a single housing 204.

In at least one embodiment, the amplifier 202 may be an active component used to amplify a portion of the received signal. In particular, the amplifier 202 may be a Low Noise Amplifier (LNA) having particular electrical characteristics. For example, the LNA amplifier 202 may be designed to amplify the received signal with predetermined gain while preventing amplification of certain noise components and to not introduce appreciable additional noise from the amplifier itself or the amplification process. Several such LNA amplifier products are available and may be referred to as tower mounted amplifiers, mast head amplifiers, tower top amplifiers, or other such nomenclature. An example of such an LNA is the LNA include in the Tower Mounted Amplifier series of products provided by LGP Corporation of Plano, Tex. Another exemplary LNA may be an LNA as shown in commonly assigned U.S. Pat. No. 5,488,382.

Thus, for the front end 103 including the first set of components 200, the received signal may be received by the terminal 206 of the dual-duplexer 201, amplified by the amplifier 202, and output to additional receiver portions via the terminal 207. As previously mentioned, the receiver front end 103 may include multiple channels, for example six dual duplexed channels.

Figure 2B:
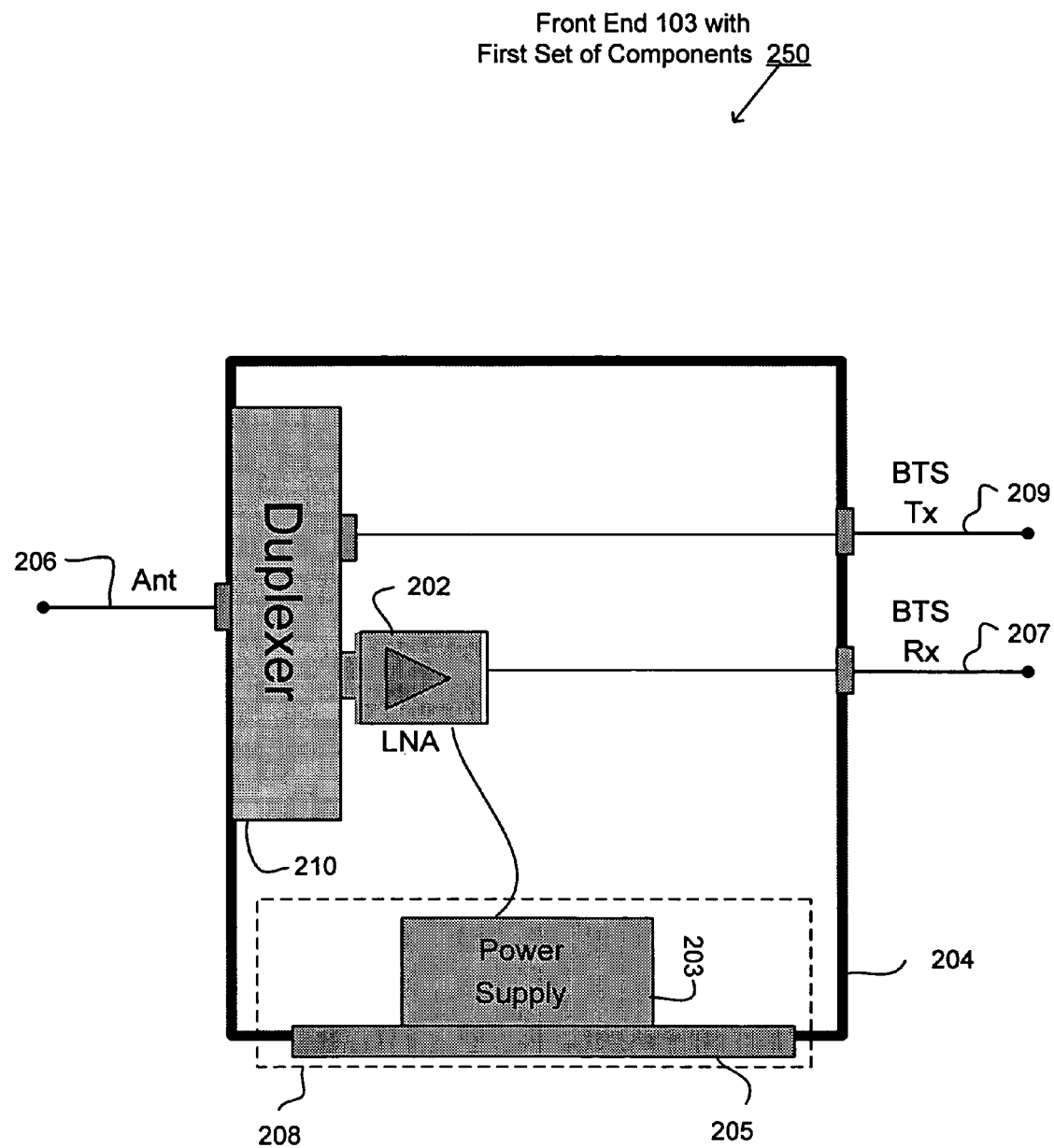
FIG. 2B is an illustration of another exemplary embodiment including a receiver front end having a different first set of components.

Other embodiments are also possible. For example, the duplexer does not need to be dual ended, or the duplexer might be eliminated (i.e., a simplex configuration). FIG. 2B shows an embodiment with a duplexer 210 and an LNA 202 coupled thereto. The output of the LNA 202 may in this case be coupled to terminal 207 and output to additional receiver portions without passing through another filter. In this case an addition terminal, terminal 209 may be required. The transmit signal may be coupled to terminal 209 and directly to duplexer 210. As shown, in this embodiment the power supply 203 and mounting panel 205 may be located perpendicular to the duplexer 210, rather than parallel with dual-duplexer 201, and may thus be a floor panel. Further, embodiments may include more than six or less than six channels per front end 103.

In many systems and applications, the above described front end 103 having the first set of components 200 may provide sufficient signal conditioning to permit economical operation of the system 100. However, a service provider may find it desirable or necessary to change the operating characteristics for the front end 103. For example, in a wireless communication system as additional wireless services are deployed in a given geographic area or location, the received signal present at the input 206 may include additional noise components not previously present. In addition, the overall noise floor may also increase. The presence of additional noise may lead to a service or system provider to upgrade the base station 101 and, in particular, the receiver front end 103, to counteract the degrading effects caused by additional noise sources. In other cases, a service provider or system provider may wish to add traffic carrying capacity. In wireless telephone systems such as GSM, CDMA, etc., the provider may wish to add traffic to a particular base station so as to improve the technical and economic performance of the system. Still further, a service provider or system provider may wish to maintain the current performance of, for example, a base station but add data service, or may wish to change the channel or channels used by the base station. Each of these scenarios, as well as others, may require the service provider or system provider to upgrade or modify the predetermined electrical characteristics of the receiver or transceiver front end 103 by, for example, replacing all or a portion of the above described first set of components with a second set of components. The second set of components may or may not include one or more items, or a subset, of the first set of components. The second set of components may be selected to provide greater receiver sensitivity, greater channel selectivity, or, in at least one embodiment, a combination thereof.

Figure 3:
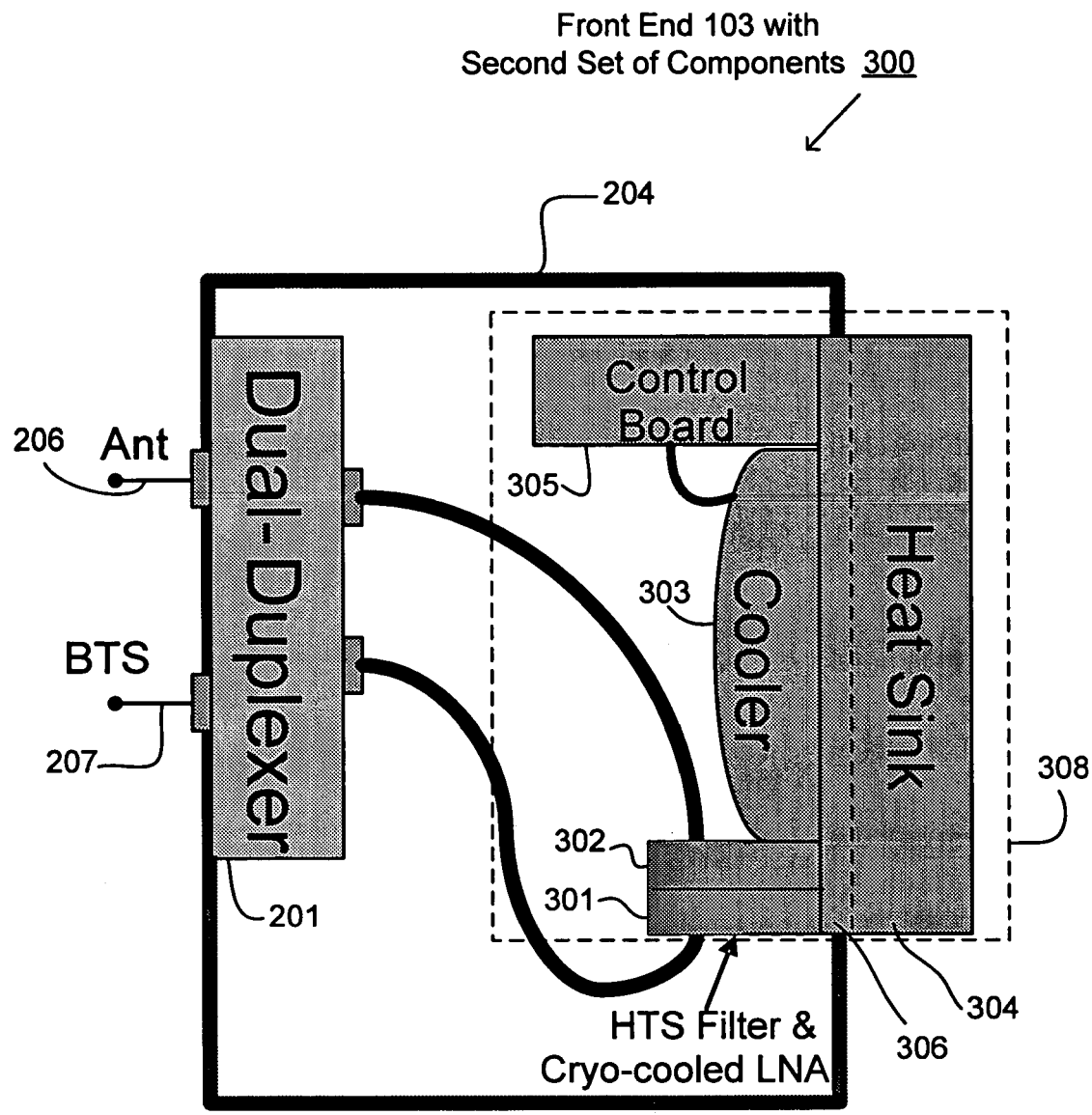
FIG. 3 is an illustration of at least one exemplary embodiment including a receiver front end having a second set of components.

Accordingly, in an embodiment, the front end 103 may be modified or upgraded to include a second set of components 300, as shown in FIG. 3. Referring to FIG. 3, the second set of components 300 may be designed to provide, for example, front end 103 operation according to second predefined characteristics. Such characteristics may include, but are not limited to, amplifier gain, sensitivity, selectivity, and filtering. Sensitivity may be a measure of the ability of an amplifier to amplify the desired portion (e.g., pass band) of the received signal (e.g., gain or transfer function). Selectivity may be a measure of the roll-off rate of the frequency response of a filter, usually expressed in dB/decade.

As is generally known in the art, the amount of noise introduced into the signal output of an amplifier may be reduced by cooling the amplifier. For certain devices such as devices made of Gallium Arsenide Field Effect Transistors (GaAs FET) the reduction in added noise continues as the device is cooled even to cryogenic temperatures. An example of such a cryogenically cooled LNA is shown and described in U.S. Pat. No. 5,488,382. Such a cryogenically cooled LNA may be used to increase received signal sensitivity of the front end 103.

Filter selectivity may be increased by using a filter based on a high temperature superconductor (HTS). The superconducting properties provide lossless or very low insertion loss which permits very high order filtering leading to the band pass portion of the filter's frequency response to have a very sharp roll-off rate (i.e., high dB/decade roll-off), while very little insertion loss or noise is added to the signal, as shown and described, for example, in U.S. Pat. Nos. 5,616,538 and 6,424,846, which are hereby incorporated herein by reference for all purposes. This sharp roll-off allows the systems designer to reduce the size of the guard band between adjacent frequency channels of the system, and may also permit greater information carrying capacity in each frequency channel of the system without increasing cross channel interference. Thus, greater selectivity may afford to a service provider greater capacity, without the need for additional frequency bandwidth or additional base stations. This can significantly improve the technical and economic operation of the system.

Therefore, as shown in FIG. 3, in at least one embodiment, the second set of components 300 for the front end 103 may include a second amplifier 301 that provides a high fidelity amplified signal without introducing significant additional unwanted noise or distortion. In an embodiment, the second amplifier 301 may provide less added noise (i.e., lower Noise Figure) than the first amplifier 202 of the first set of components 200. The second amplifier 301 may be, for example, a cryogenically cooled amplifier such as that shown and described in U.S. Pat. No. 5,488,382.

Furthermore, the second set of components 300 may also include a filter 302. The filter 302 may be a bandpass filter designed to block unwanted components in the signal (e.g., signal components falling outside the pass band of the filter). In at least one embodiment, the filter 302 is a High Temperature Superconductor (HTS) based filter such as, for example, the HTS filter shown and described in U.S. Pat. Nos. 5,616,538 and 6,424,846, which are hereby incorporated herein by reference for all purposes. As shown in FIG. 3, the amplifier 301 and the HTS filter 302 may be included in the same subcomponent structure. In another embodiment the LNA may be a conventional non-cryo-cooled LNA.

In an embodiment, the second set of components 300 may further include the dual-duplexer 201, a cryogenic cooler 303, a heat sink 304, and a control board 305, and a second module mounting panel 306. A cryo-cooled system module 308 may include, for example, a cryogenic cooler 303, a heat sink 304, a control board 305, and a second module mounting panel 306. The system may also include a cryo-cooled HTS filter 302 and/or an LNA 301. In one variation, the means for mounting the cryo-cooled system module together and to the housing 204, may be the heat sink 304, without the need for mounting panel 306. In this case, the control board 305, cooler 303, HTS filter 302 and/or an LNA 301 may be mounted directly to the heat sink 304 and the heat sink 304 mounted to the housing 204. Note that the second set of components 300 may include a subset of the first set of components 200 such as, for example, the dual-duplexer 201 and/or housing 204. As shown by comparing FIG. 2 and FIG. 3, an upgraded front end 103 may be achieved in this case by removing the amplifier module 202 and power supply module 208 and replacing them with the cryo-cooled system module 308, while utilizing the housing 204 and dual-duplexer from the initial front end system 103 with first set of components 200. This makes for a system that has an easy and cost effective upgrade. Other combinations of the first set of components 200 and the second set of components 300 are also possible, some of which are described below.

Figure 4:
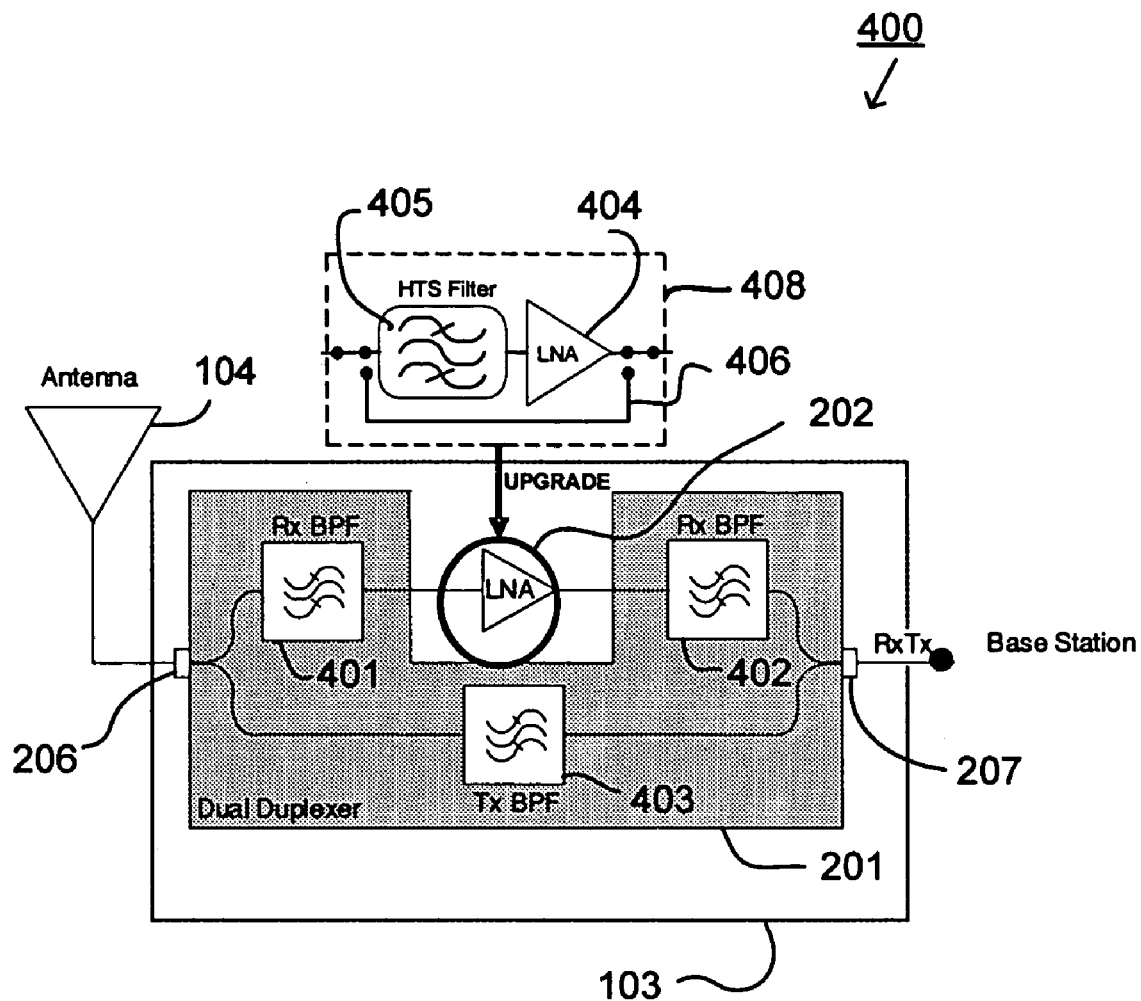
FIG. 4 is a schematic block diagram of at least one exemplary embodiment including a receiver front end having one type of first set of components.

FIG. 4 is a schematic block diagram showing the electrical signal flow of at least one embodiment 400 of the receiver or transceiver front end 103 having the first set of components 200. Referring to FIG. 4, the antenna 104 may be coupled to the dual-duplexer 201 via the terminal 206. The received signal may be presented to a first receive bandpass filter 401, the output of which may be coupled to the LNA 202. The amplified signal output from LNA 202 may then be coupled to a second receive bandpass filter 402, the output of which may be routed to downstream receiver components via the terminal 207. For outgoing signal transmission, the transmitted signal is routed to the dual-duplexer 201 from upstream transmit chain components via output 207. (For consistency, dual-duplexer terminal 206 and terminal 207 are thus described in one way for the receive direction. It should be understood that for transmit, the terminal 207 receives the transmitted signal and terminal 206 couples the transmitted signal to, for example, antenna 104 or a connection cable.) Further details regarding operation of an embodiment 400 may be found in, for example, commonly assigned U.S. Pat. No. 6,686,811, which is hereby incorporated herein by reference for all purposes.

FIG. 4 also shows one example of an upgrade replacement, having the LNA 202 of the first set of components 200 being replaced with the amplifier 404 (e.g., 301) and filter 405 (e.g., 302) of the second set of components 408. Following upgrade, the received signal output of receive bandpass filter 401 may be coupled to the input of the filter 405. The output of the filter 405 may be coupled to the input of the amplifier 404. The output of the amplifier 404 may be coupled to the receive bandpass filter 402. The filter 405 may be a bandpass filter. The filter 405 may have improved frequency response and/or a sharper roll-off than bandpass filters 401 and 402. In one embodiment, the filter 405 may be, but need not be, an HTS filter 302 and the LNA 404 may be, but need not be, a cryo-cooled LNA 301. The second set of components 408 may also include a bypass circuit 406 to maintain operation of the base station 101 in the event of a failure the HTS filter 302 or LNA 404.

Figure 5:
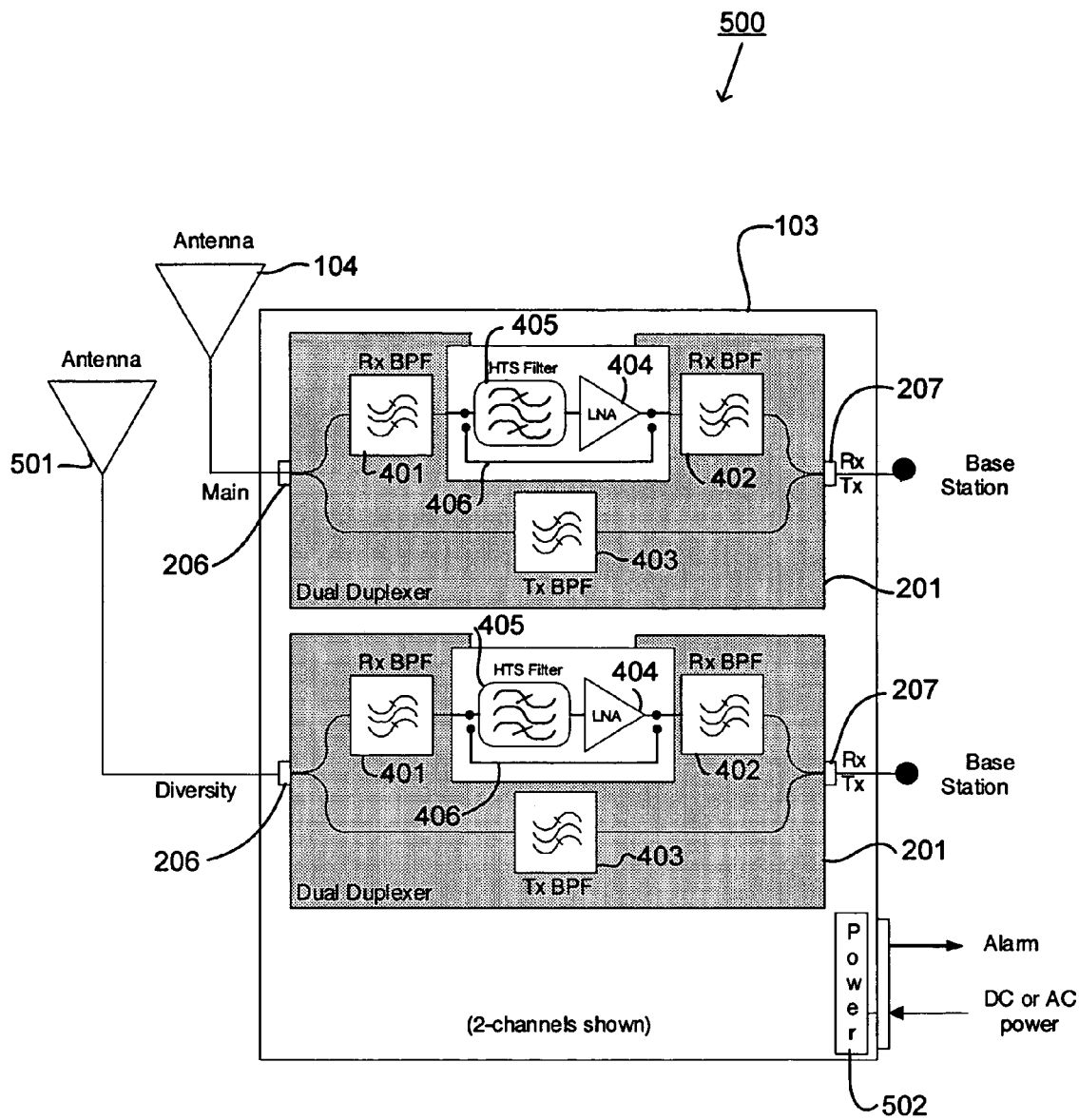
FIG. 5 is a schematic block diagram of an exemplary embodiment including a receiver front end having a second set of components and multiple channels.

FIG. 5 is a schematic block diagram of an embodiment 500 of the receiver or transceiver front end 103 having the second set of components 408 (e.g., 300) and multiple channels. For illustrative purposes, two channels are shown. However, it is to be understood that any number of channels may be provided. In at least one embodiment 500, the receiver or transceiver front end 103 may include six channels or RF paths. In an embodiment 500, the receiver front end 103 may include a second antenna 501 and/or connection cable, which may provide antenna diversity, in addition to the main antenna 104. Alternatively, three or four antennas may be provided for diversity. The receiver or transceiver front end 103 may include one or more shared power supply 502. The power supply 502 may include alarm monitoring circuits. The power supply 502 may also use redundant components in order to assure operation of the main diversity channel in the event of a failure. In other respects, an embodiment 500 may be substantially as shown and described with respect to FIG. 4.

Figure 6:
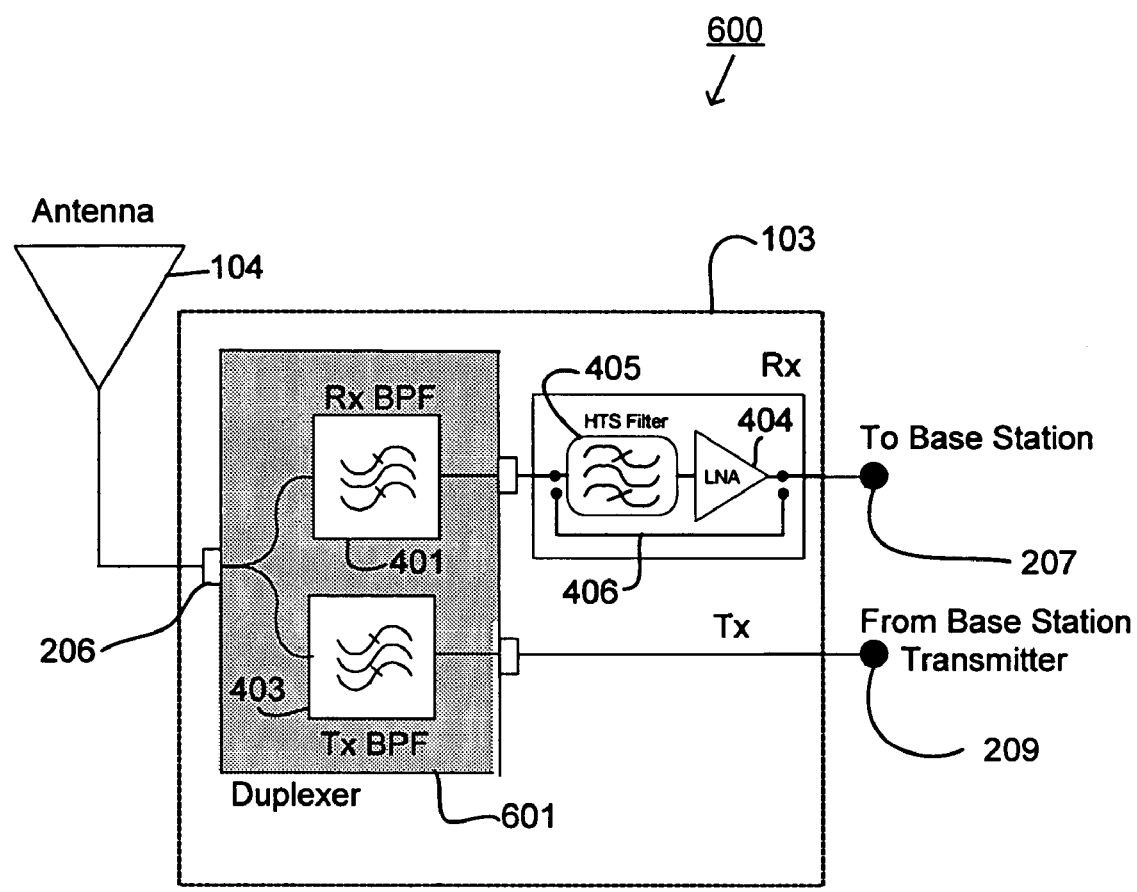
FIG. 6 is a schematic block diagram of an exemplary embodiment including a receiver front end having a second set of components and a duplexer.

Furthermore, FIG. 6 is a schematic block diagram of an embodiment 600 of the receiver or transceiver front end 103 having the second set of components 408 (e.g., 300), and a duplexer 601 instead of the dual-duplexer 201. In such an embodiment 600, the received signal output of receive bandpass filter 401 may be coupled to the input of the filter 406, and the output of the filter 406 may be coupled to the input of the amplifier 404, also substantially as shown and described with respect to FIG. 4.

The housing 204 shown in FIG. 3 may be the same housing 204 shown in FIG. 2. Thus, the housing 204 may be configured to contain receiver or transceiver front end 103 regardless of the particular set of components comprising the front end 103. For example, the housing 204 may physically and functionally accommodate the front end 103 including the first set of components 200 or the second set of components 300, or any combination thereof. In at least one embodiment, the housing 204 may have a volume of 13824 cubic inches and dimensions of twenty-four (24) inches in length, width, height. In one variation, the housing 204 may have a volume of 8064 cubic inches and dimensions of twenty-four (24) inches in width, twenty-four (24) inches in height, and fourteen (14) inches in length.

In at least one embodiment, the second amplifier 301, filter 302, cryogenic cooler 303, heat sink 304, and control board 305 may be mounted or affixed to the second mounting or modular panel 306. In an embodiment, the housing 204 may be configured to accept either the first mounting or modular panel 205 or the second mounting or modular panel 306 without structural modification. Thus, a service provider may upgrade the receiver front end 103 from the first set of components 200 to the second set of components 300 by removing the first panel 205 and replacing it with the second panel 306 populated with a subset of the second set of components 300, for example, as shown in FIG. 3. In at least one embodiment, panel 205 or panel 306 may be located at the rear, or back, of the housing 204.

The control board 305 may include logic elements for controlling the operation and maintaining the operating parameters of, for example, the amplifier 301 (e.g., 404) and the filter 302 (e.g., 405). The control board 305 may also include alarm monitoring and reporting circuits to detect and report various abnormal operating conditions of the front end 103. In at least one embodiment, the control board 305 may be implemented using a microprocessor such as, for example, an Intel Pentium® microprocessor available from Intel Corporation of Portland, Oreg. Alternatively, the control board may be implemented using a microcontroller. Alarm monitoring and reporting may be provided for each channel provided by the front end 103.

Further, an upgrade may also include removing a subset of the first set of components 200 not to be reused such as, for example, the amplifier 202, while retaining certain other items of the first set of components 200 such as, for example, the dual-duplexer 201. In addition, cabling used with the first set of components 200 may be reused with the second set of components 300. The aforementioned embodiments are particularly useful as a receiver or transceiver front end having an enclosure that is capable of being installed as an external system, often on the ground near an antenna tower without being in a building. Further, it is noteworthy that in these embodiments the duplexers are oriented so that their long side is vertical to the bottom of the enclosure.

Figure 7:
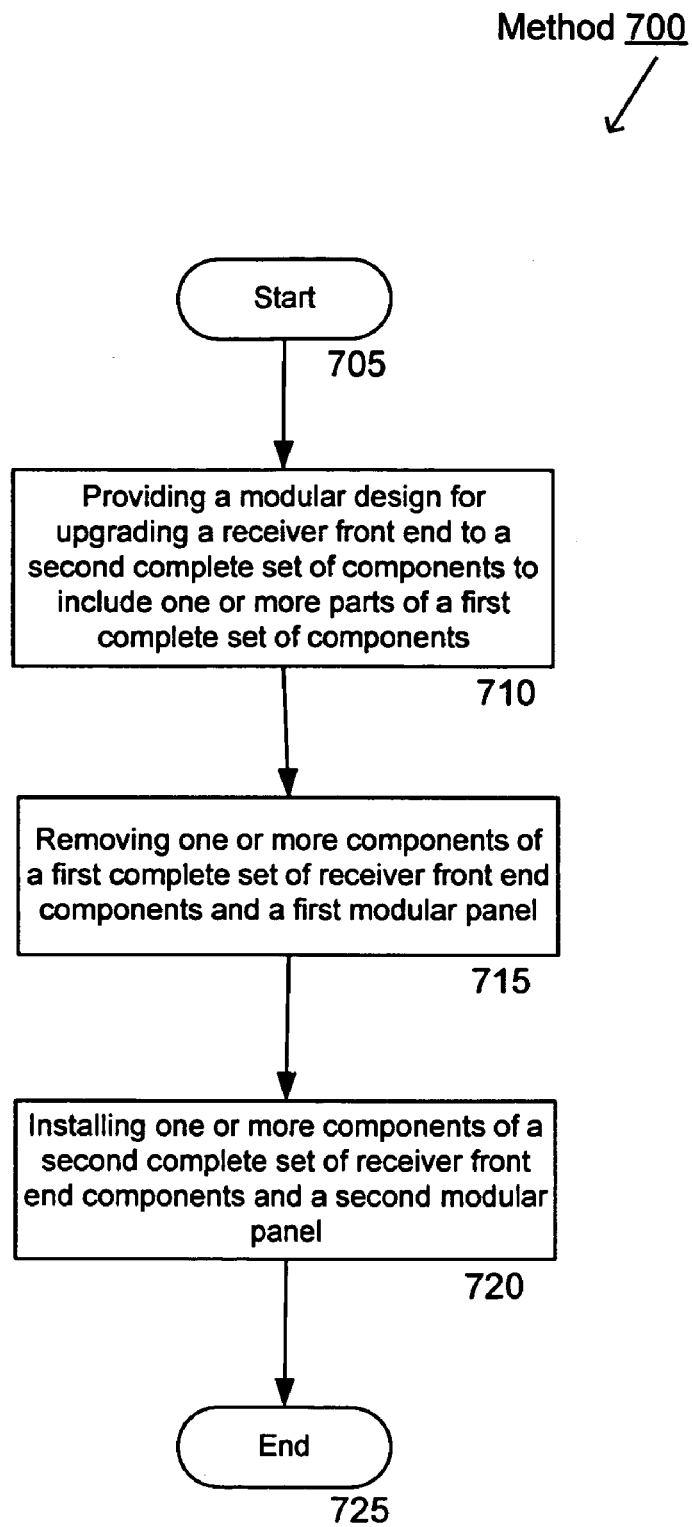
FIG. 7 is a flow chart of a method according to at least one exemplary embodiment.

A method 700 according to at least one embodiment is shown in the flow chart of FIG. 7. Referring to FIG. 7, a method 700 may commence at 705 and proceed to 710, at which a modular design may be provided for upgrading a receiver front end to a second complete set of components that includes one or more parts of a first set of components. Method 700 may then proceed to 715, at which service personnel may remove one or more components of the first complete set of receiver front end components. One or more of the first set of components may be mounted or affixed to a first mounting or modular panel.

Method 700 may then proceed to 720, at which service personnel may install one or more components of a second complete set of receiver or transceiver front end components and a second modular panel. The second complete set of components may include different components than the first set of components. Further, one or more of the different components included in the second set of components may be mounted or affixed to a second mounting or modular panel. In at least one embodiment, to accomplish an upgrade the first mounting or modular panel, which may be a removable rear panel, is removed and replaced with a second mounting or modular panel, which may be a heat sink assembly as shown in FIG. 3. The second modular panel assembly may include a new controller board, cooler, and dewar with one or more HTS filters inside, as shown in FIG. 3. The conventional LNAs may be removed and new cabling added to route the received signal from the dual-duplexers to the HTS dewar and back. New wiring harnesses may be installed to route power and alarm functionality as required. Method 700 may then proceed to 725, at which a method may end.

Furthermore, the design of the receiver front end chassis may be modular so that minimal modifications are required to accomplish the upgrade. Thus, a user of the system, such as, for example, a wireless service provider, can preserve the capital investment in the current system and reuse a portion of the receiver front end components already purchased. For example, a modular panel such as, for example, a rear panel, may be provided to allow simple replacement of the conventional amplifier or amplifiers and the power supply and/or alarm circuit board on a first modular panel with a heat sink that has HTS and cryogenic equipment such as, for example, a HTS filter and cryo-cooled amplifier, pre-mounted on a second modular panel to accomplish the upgrade.

For example, the system may include an enclosure containing two sections, a first original section and a second original section. The first original section may contain primarily components that will remain after upgrade and the second original section may contain primarily components to be removed during upgrade. In one embodiment the first original section may be configured so that as a result of upgrade it will house primarily original components while an upgrade enclosure houses the upgrade components. For upgrade, the first original enclosure and the upgrade enclosure may be coupled to each other electrically and/or physically. In one variation, the first original section and the upgrade enclosure may each have one side open and the two enclosures may be coupled together at the openings so as to form a single enclosure with a wall on each side. Of course, the two enclosures may be constructed so that they each contain some of the original components that have remained after other components are upgraded. In one variation, an original LNA may be used in conjunction with a cryo-cooled HTS filter. These alternative embodiments and variations are particularly useful for small enclosures where the receiver front end may have a small packaging size, for example, as a internal rack mount front end contained in a building or a tower mounted amplifiers system.

Figure 8:
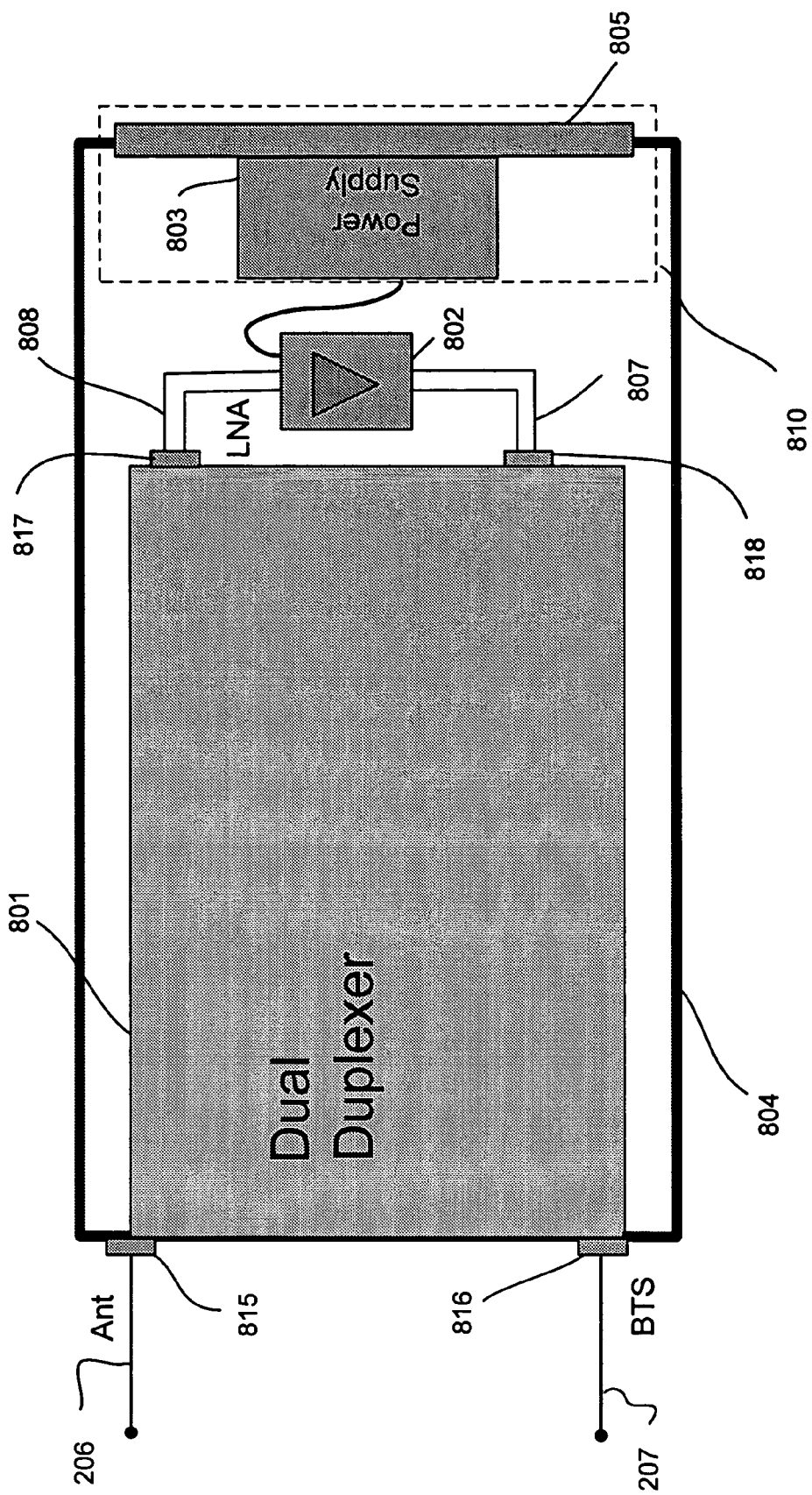
FIG. 8 is an illustration of another exemplary embodiment including a receiver front end having a different first set of components including a modified dual duplexer.

Referring to FIG. 8, another embodiment illustration of a transceiver or receiver front end is provided. In this case, a horizontally oriented duplexer 801. Duplexer 801 may be, for example, dual duplexer 801. By providing a horizontal oriental duplexer a small elongated enclosure 804 may be provided. The duplexer may have two connectors on each of the short sides, a first connector 815 that may be coupled to an antenna with a terminal 206, a second connector 816 that may be coupled to a BTS with a terminal 207, a third connector 817 coupled to a tube or cable 808 and a fourth connector 818 coupled to a tube or cable 807. Connectors 815, 816, 817, and 818 may be, for example, female or mail connectors. An LNA 802 may be coupled to connector 817 of the dual duplexer with tube or cable 808 and to connector 817 of the dual duplexer 801 with tube or cable 807. The LNA 802 may be coupled to and powered by power supply 803. Power supply 803 may be coupled to panel 805. The power supply 803 and panel 805 are included in a module 810. The module 810 may be removed if an upgrade to, for example, a cryo-cooled HTS filter and/or LNA is desired.

Figure 9:
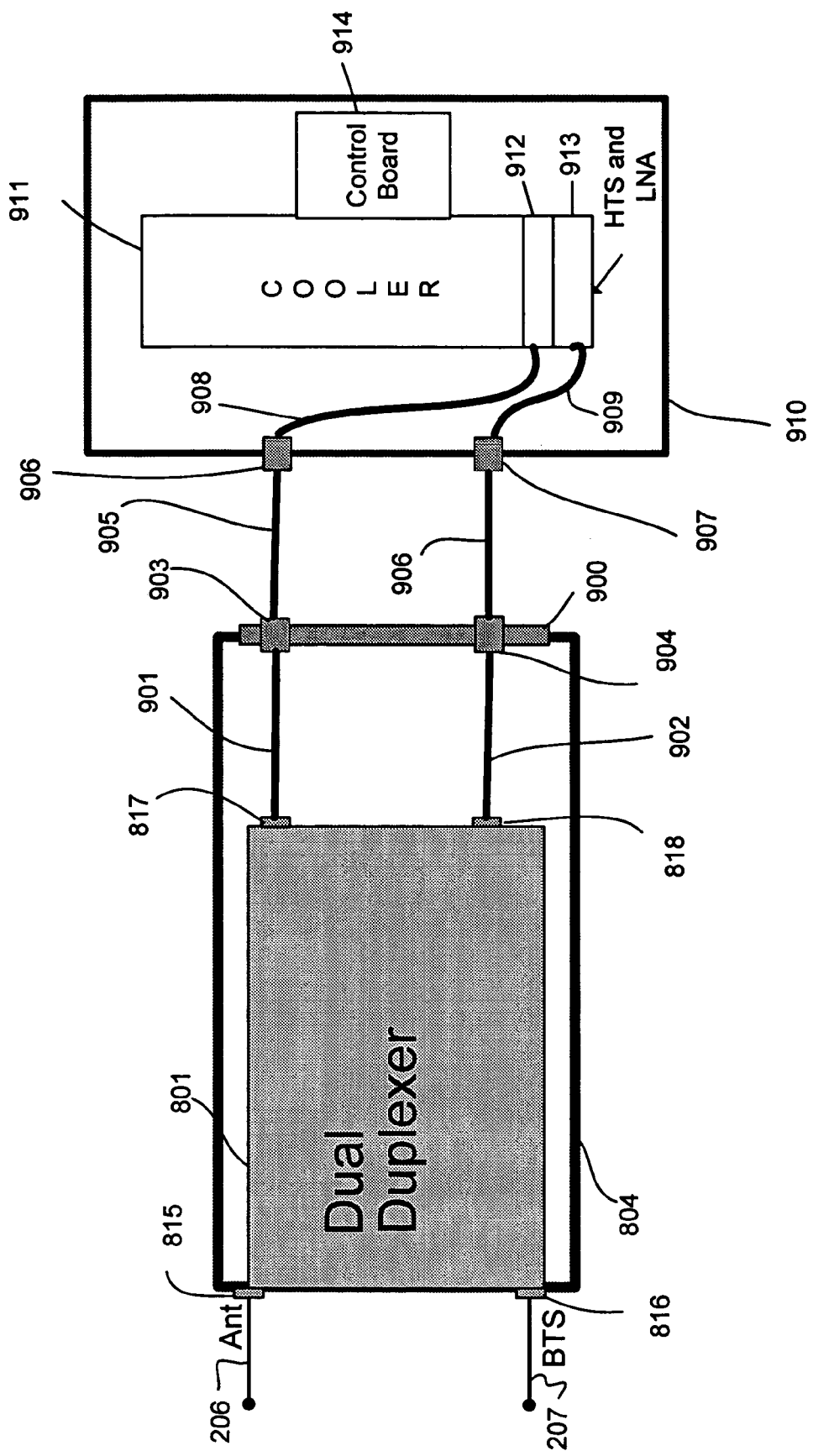
FIG. 9 is an illustration of an exemplary embodiment including a receiver front end having a second set of components provided in a second housing and electrically coupled to a first housing.

Referring now to FIG. 9, an illustration of a first upgrade configuration is provided. In this case, module 810, LNA 802, and tubes 808 and 807 are removed from the original front end enclosure. Panel 900 having connectors 903 and 904 coupled thereto is added as the back plate or wall to cap off the original enclosure 1004. Connector 903 is coupled to connector 817 of the duplexer 801 by cable or wire 901. Connector 904 is coupled to connector 818 of the duplexer 801 by cable or wire 902.

A second separate upgrade enclosure 910 may be provided to house one or more upgrade components to provide an improved performance transceiver or receiver front end. For example, the upgrade enclosure may include a cooler 911, a control board 914, an HTS 912 and/or an LNA 913. The upgrade enclosure may include connectors 906 and 907. Connector 906 and 907 may be coupled to the HTS and/or LNA by, for example, wires or cables 908 and 909, respectively. The original enclosure 1004 and the duplexer 801 may be connected to the upgrade enclosure 910 and HTS and LNA by, for example, wires, cables, or terminals 905 and 906. In one variation, RF cables may be used for cables 905 and 906.

Figure 10:
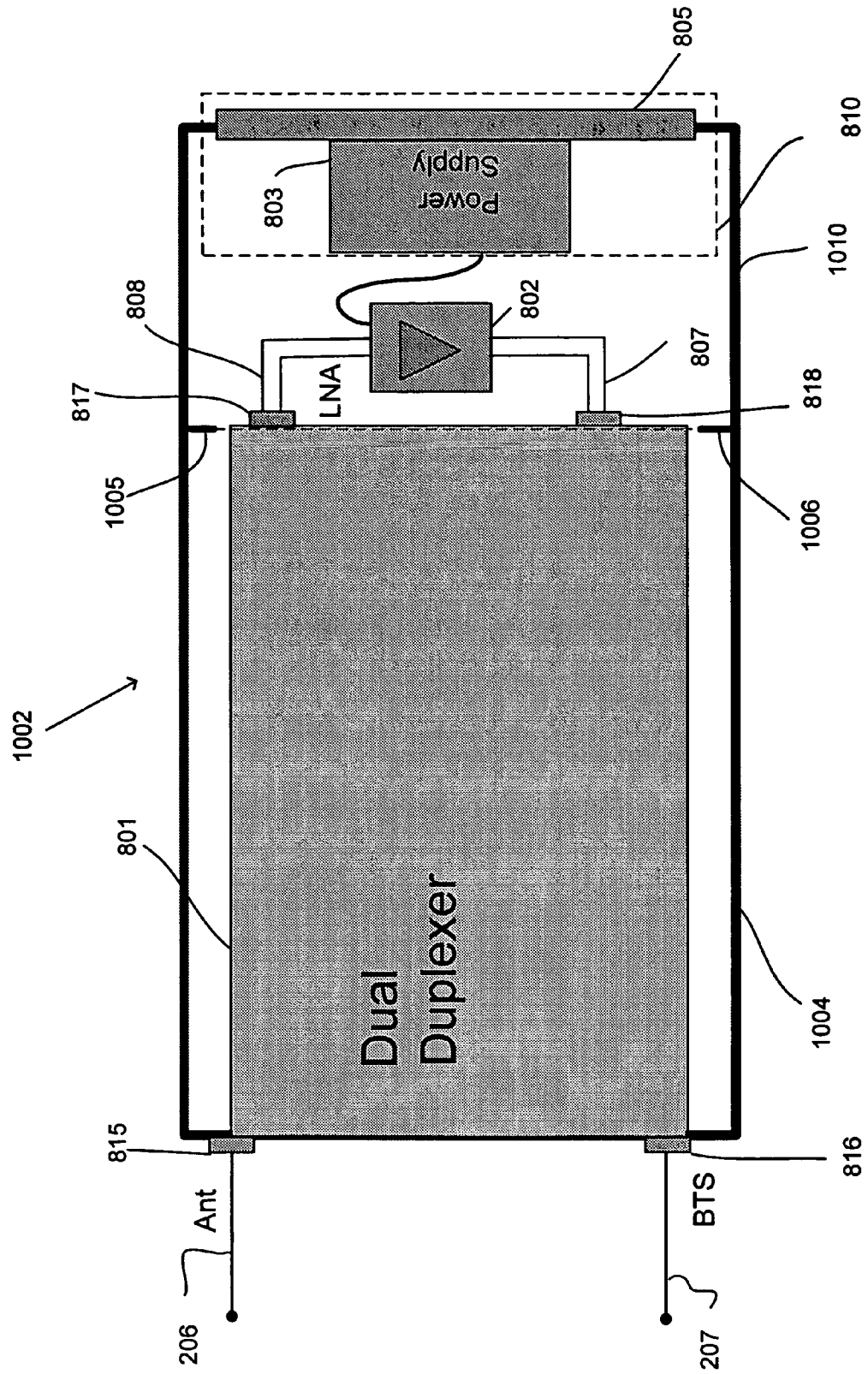
FIG. 10 is an illustration of another exemplary embodiment including a receiver front end having a different first set of components including a modified dual duplexer and a two section housing.

Referring now to FIG. 10, another embodiment illustration of an original component enclosure 1002 is provided. This embodiment is similar to the embodiment shown in FIG. 8 and has an elongated enclosure 1002 and duplexer 801. In this embodiment, the enclosure 1002 has two separate enclosure sections, section 1004 and section 1010, each having five closed sides that enclosed one or more original components. Enclosure sections 1004 and 1010 are coupled together at ridges 1005 and 1006. These ridges may be included on both sections 1004 and 1010 and may be coupled together with, for example, screws, clips, etc. In this configuration an upgrade may be performed by removing enclosure 1010 with its components, for example, power supply 803. Once enclosure section 1010 is removed, the LNA 802 and coupling tubes, wires or cables 808 an 807 may be removed and new upgrade components installed. Although module 810 is shown in this embodiment to include a plate 805 for mounting the power supply 803 and capping off the back of enclosure 1010, the enclosure section 1010 could have a permanent back wall rather than a removable plate 805.

Figure 11:
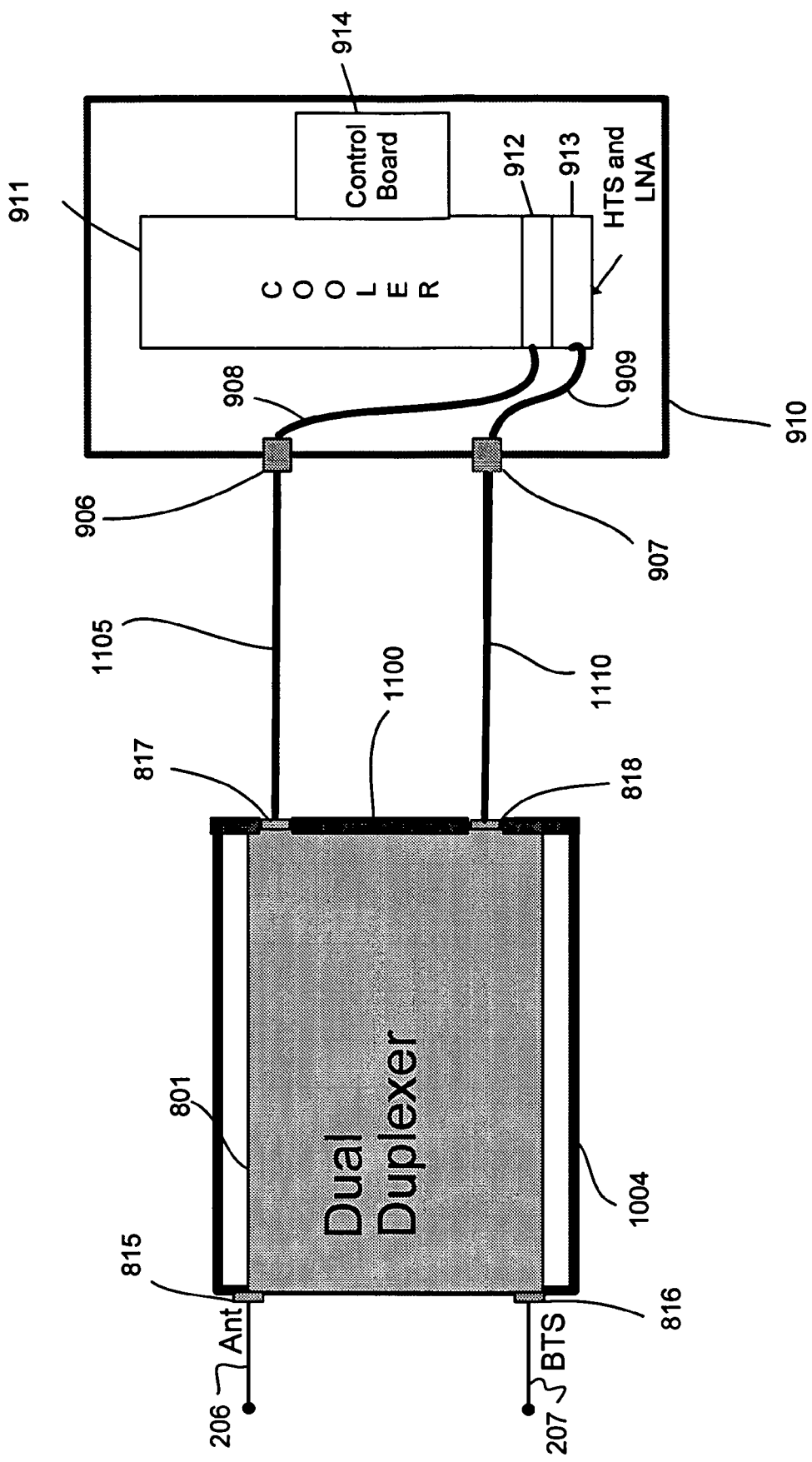
FIG. 11 is an illustration of an exemplary embodiment including a receiver front end having a second set of components provided in a second housing and electrically coupled to a first housing.

Referring now to FIG. 11, another illustration of the upgrade configuration is provided for using the front end illustrated in FIG. 10. In this embodiment, a second enclosure 1010 with its components and the LNA 802 and tubes, wires or cables, 807 and 808 is remove. Then a plate 1100 having through holes for connectors 817 and 818 is affixed to enclosure section 1004. A separate upgrade enclosure 910 having upgraded components is coupled to the capped first enclosure using, for example, wires or cables 1105 and 1110 couple to connector 817 and 818, respectively, of the duplexer 801. The upgrade enclosure 910 may include upgrade components, for example, a cooler 911, a control board 914, and a cryo-cooled HTS filter 912 and/or LNA. The HTS filter 912 and LNA 913 may be coupled to connectors 906 and 907 with, for example, wires or cables 908 and 909. And cables or wires 1105 and 1110 may also couple to connectors 906 and 907. Cables or wires 1105 and 1110 may be, for example, RF cables. This approach has fewer parts than the embodiment shown in FIG. 9 by eliminating one set of wires or cables and one set of connectors.

Figure 12:
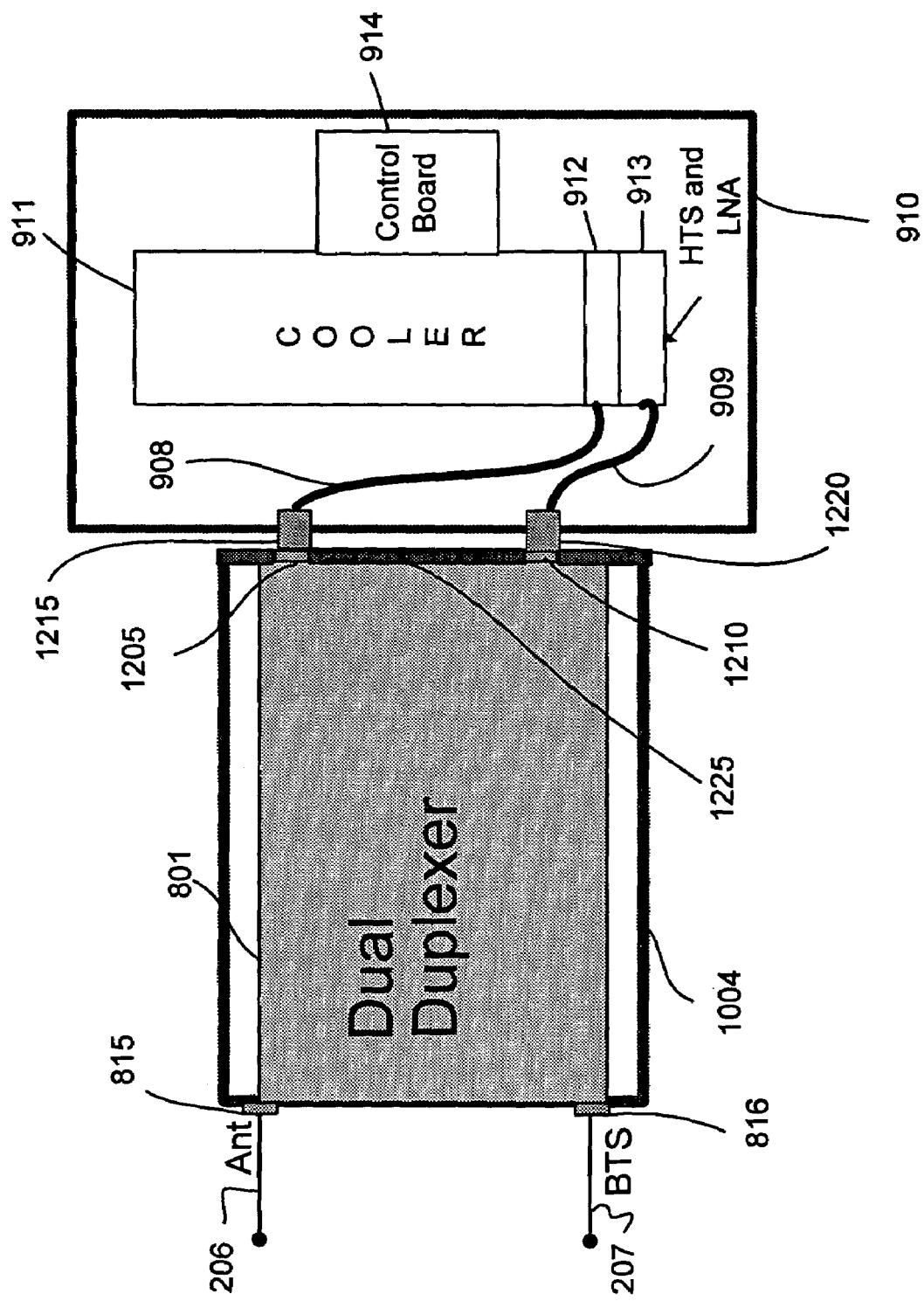
FIG. 12 is an illustration of an exemplary embodiment including a receiver front end having a second set of components provided in a second housing and electrically coupled directly to a first housing and a dual duplexer.

Referring now to FIG. 12, another illustration of an upgraded configuration is provided. This embodiment is similar to the embodiment of FIG. 11, but is simplified by coupling connectors 1205 and 1210 of the duplexer 801 to connectors 1215 and 1220 of the upgrade, without the use of intervening wires or cables. In this configuration, connectors 1215 and 1220 may be located on the housing of upgrade enclosure 910 in particular locations so that they will align with the connectors 1205 and 1210, respectively. Further, connectors 1205 and 1210 and connectors 1215 and 1220 may be constructed so that they mate to one another and make electrical and physical interconnects without the need for additional components. For example, connectors 1205 and 1210 may be a female connector while connectors 1215 and 1220 may be male connectors and each connector may have a structure or shape for interlocking on to the other. Alternative, each of connectors 1205, 1210, 1215, and 1220 may be female connectors and, for example, studs, rods or tubes may be used to connect one to the other.

Figure 13:
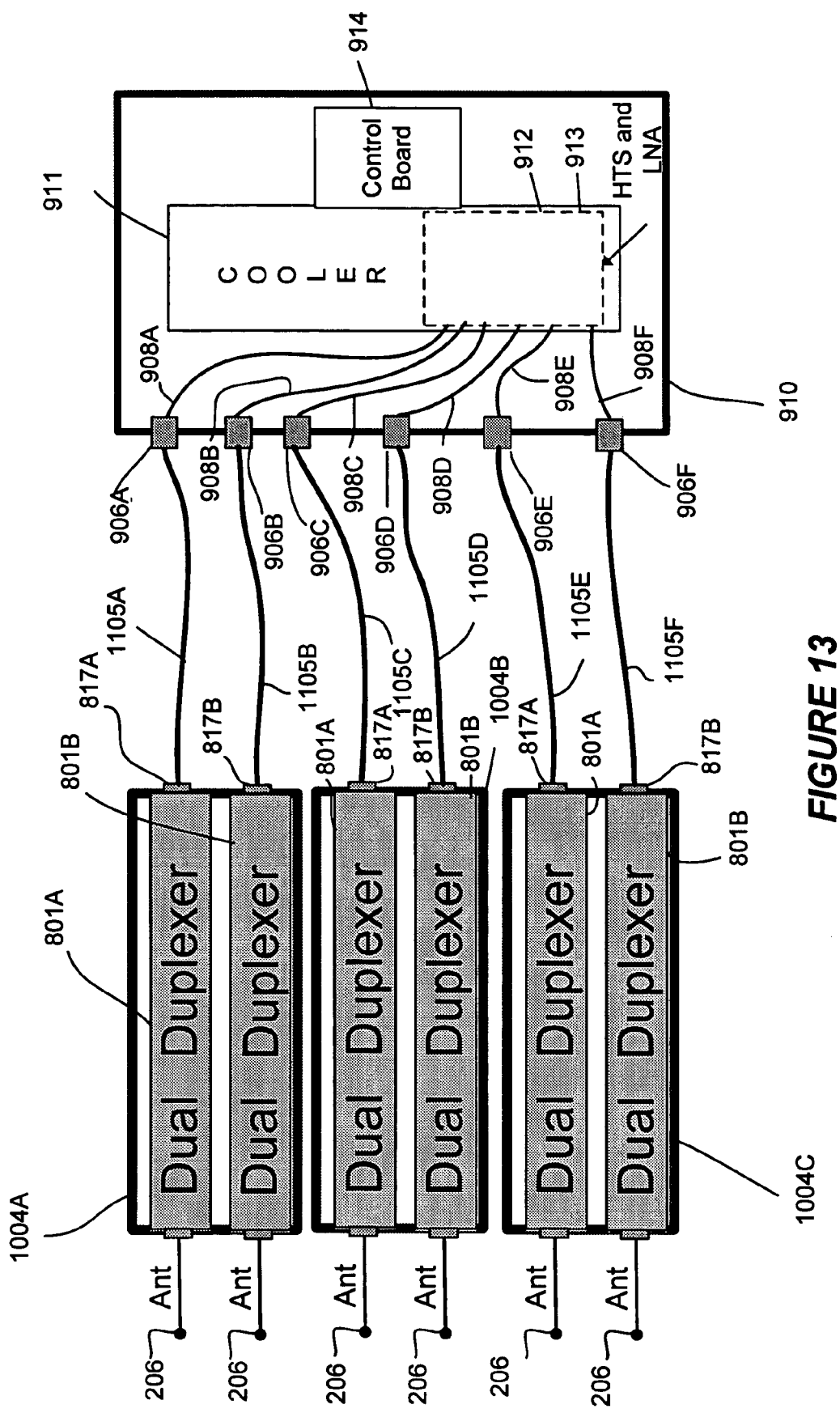
FIG. 13 is an illustration of an exemplary embodiment including a receiver front end having a second sets of components provided in a second housing and electrically coupled to three first housings including two dual duplexers each.

Referring now to FIG. 13, an illustration of an embodiment having three two channel enclosures coupled to a single six channel upgrade enclosure. This illustration provides a top view of the system enclosures and their components. In this case, one channel in each of enclosures 1004A, 1004B and 1004C may be used as a primary channel (e.g., duplexer 801A) and one channel may be used as a diversity channel (e.g., 801B). (See also FIG. 5 and the related description.) Each of the six duplexers 801A and 801B may have a pair of connectors (only one shown, 817A or 817B) that connect to a related pair of connectors (only one shown, 906A-F) of the upgrade enclosure 910. The related connectors of the duplexers (817A and 817B) are coupled to their respective connectors (906A-906F) by, for example, wires, cables, etc. 1105A-1105F. In this case there are therefore a total of 12 connectors for the six duplexers 801A and 801B and twelve related connectors of the upgrade enclosure 910 which may include a cooler 911, control board 914, HTS 912 and/or LNA 913. However, the related connectors are not necessarily located in any particular location or alignment.

Figure 14:
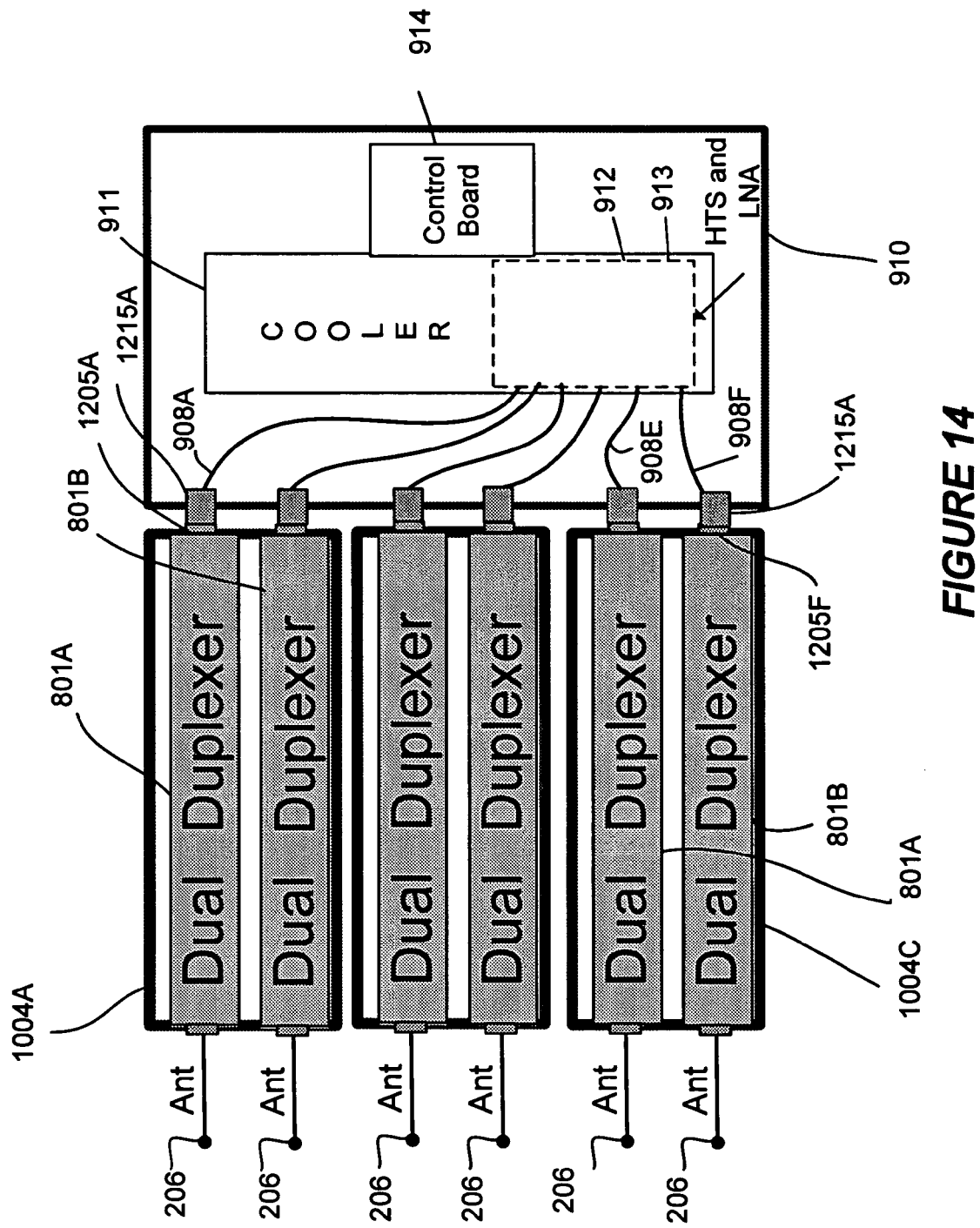
FIG. 14 is an illustration of an exemplary embodiment including a receiver front end having a second set of components provided in a second housing and electrically coupled directly to three first housings including two dual duplexers each.

FIG. 14 illustrates another embodiment that is similar to the embodiments shown in FIG. 12 and 13. However, the front end shown in FIG. 14 has duplexer 801 connectors 1205 and upgrade enclosure 910 connectors 1215 that align with one another so that the three two duplexer enclosures 1004A-C can be coupled to one another without the need for interconnecting wires, cables, etc. 1105. As with the embodiment of FIG. 13, only 6 connectors of 12 are shown. As can be seen, the six duplexers 801 are coupled directly to the upgrade enclosure connectors 1205.

Further, connectors 1205 and connectors 1215 (and the connectors 1210 and 1220 not shown) may be constructed so that they mate to one another and make electrical and physical interconnects without the need for additional components. For example, connectors 1205 (and connectors 1210) may be a female connector while connectors 1215 (and connectors 1220) may be male connectors and each connector may have a structure or shape for interlocking on to the other. Alternative, each of connectors 1205, 1210, 1215, and 1220 may be female connectors and, for example, studs, rods or tubes may be used to connect one to the other.

Figure 15:
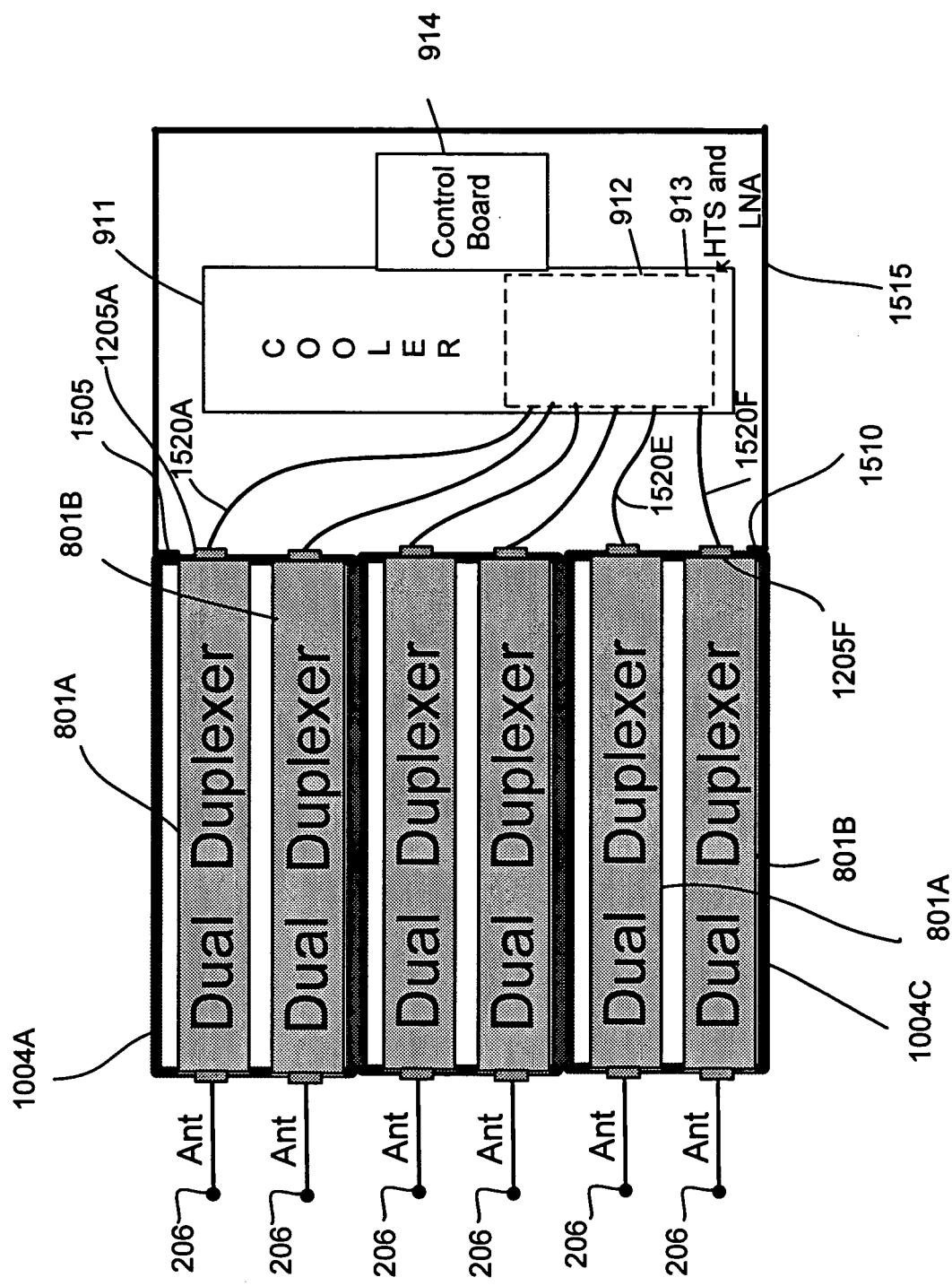
FIG. 15 is an illustration of an exemplary embodiment including a receiver front end having a second set of components provided in a second housing and electrically and physically coupled directly to three first housings including two dual duplexers each.

FIG. 15 illustrates a still further embodiment that is similar to the embodiments shown in FIG. 13 and 14. In this embodiment, the upgrade enclosure 1515 has an open side which is abutted to the connector side of three two duplexer enclosures 1004A-1004C. The three two duplexer enclosures 1004A-1004C may be directly abutted one to another and connected to the upgrade enclosure 1515 via lips or tangs 1505 and 1510. The HTS filters 912 and LNA 913 may be connected to the duplexers 801 connectors 1205A-1205F with, for example, wires, cables etc. 1520A-1520F.

Figure 16:
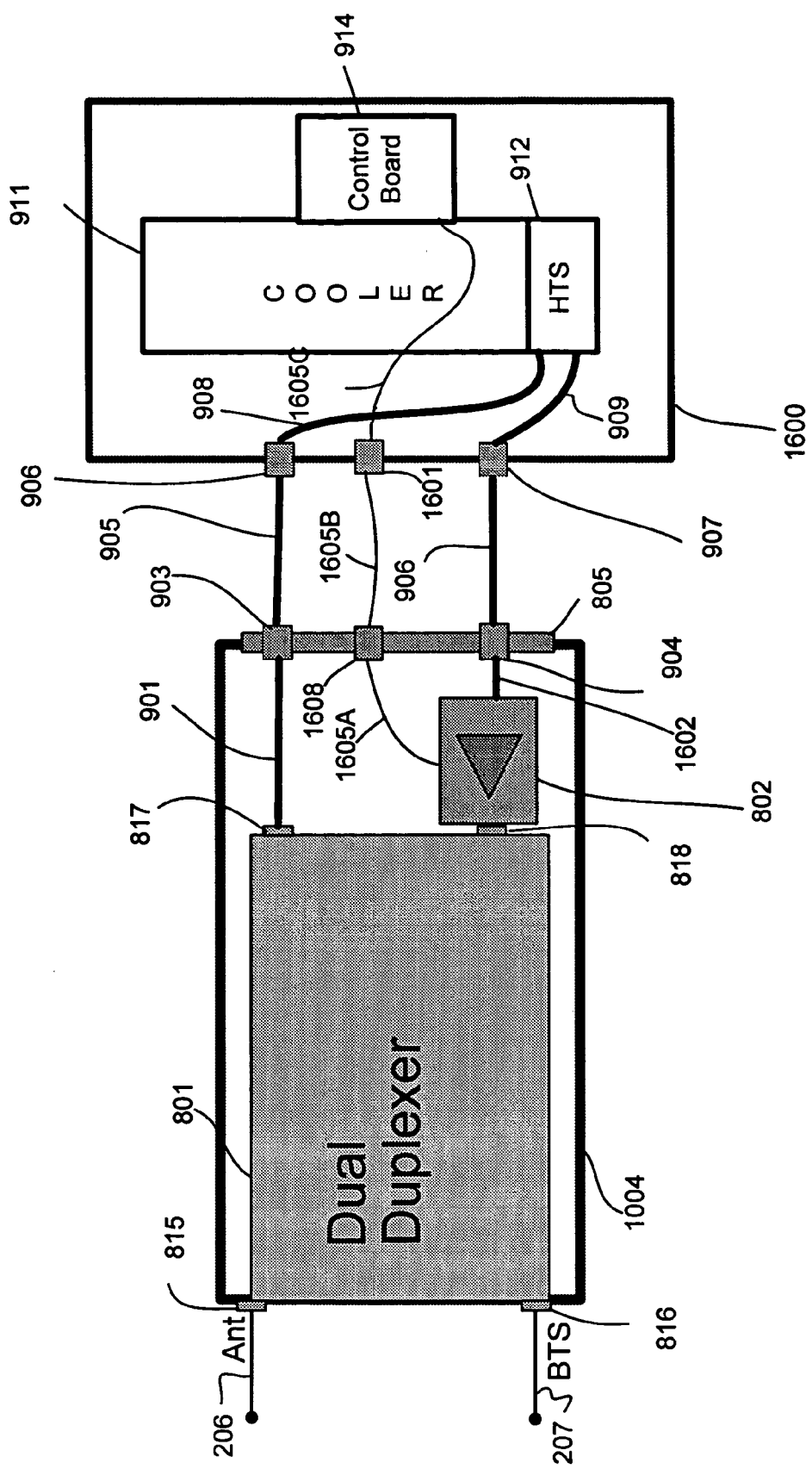
FIG. 16 is an illustration of an exemplary embodiment including a receiver front end having a second set of components provided in a second housing and electrically coupled to a first housing.

FIG. 16 illustrates an embodiment in which a cryo-cooled HTS 912 is provided in an upgrade enclosure 1600 and is coupled to a duplexer 801 and LNA 802 contained in a horizontally elongated enclosure 1004. The LNA may be powered by a power supply in the upgrade enclosure 1600 through connector 1601 and connector 1608 with, for example, wires, cables, etc. 1605A-1605C. Further, the HTS 912 may be coupled to LNA 802 with, for example, wires, cables, etc. 909, 906, 1602.

Figure 17:
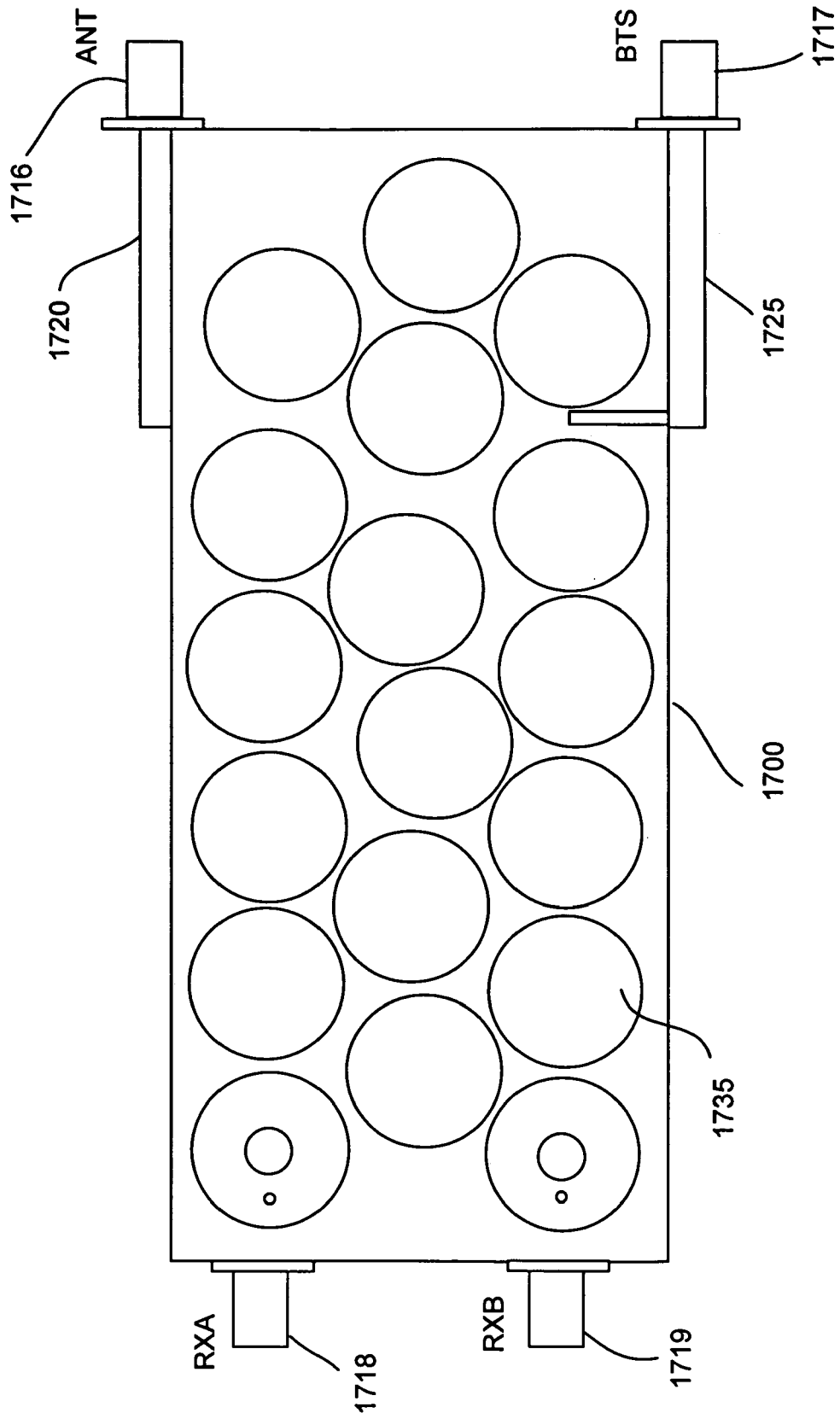
FIG. 17 is an illustration of an exemplary embodiment for a dual duplexer with connectors located on the short sides.

FIG. 17 illustrates a configuration for a dual duplexer 1700 particularly useful for use as a duplexer with the embodiments of FIGS. 8-16 or wherever a duplexer with connections located on narrow sides would be useful. In general, the duplexer may have a multiple number of cavities arranged in a many different rows. The number of cavities is decided by the required filter response where as number of rows are decided by the size & shape of the duplexer. In particular, the dual duplexer 1700 has a plurality of 18 cavities (e.g., cavity 1735) interdigitated in three rows. A first connector 1716 that may be for an antenna port may be coupled to the cavities with, for example, a pipe or tube 1720 and attached to a short side, the right side, of the dual duplexer 1700. A second connector 1717 that may be for a BTS port may be attached to the short right side of the dual duplexer 1700 and to the cavities with a tube or pipe 1725 and channel 1730. A third connector RXA 1718 is coupled to the cavities and connected to the left short sides of the dual duplexer 1700. A forth connector RXB 1719 is coupled to the cavities and connected to the left short sides of the dual duplexer 1700. The position of the connectors may vary and may be mainly driven by the over-all packaging style and size requirements. However, the position of the connectors should be selected to enable quick and efficient modular upgrades possible.

Figure 18:
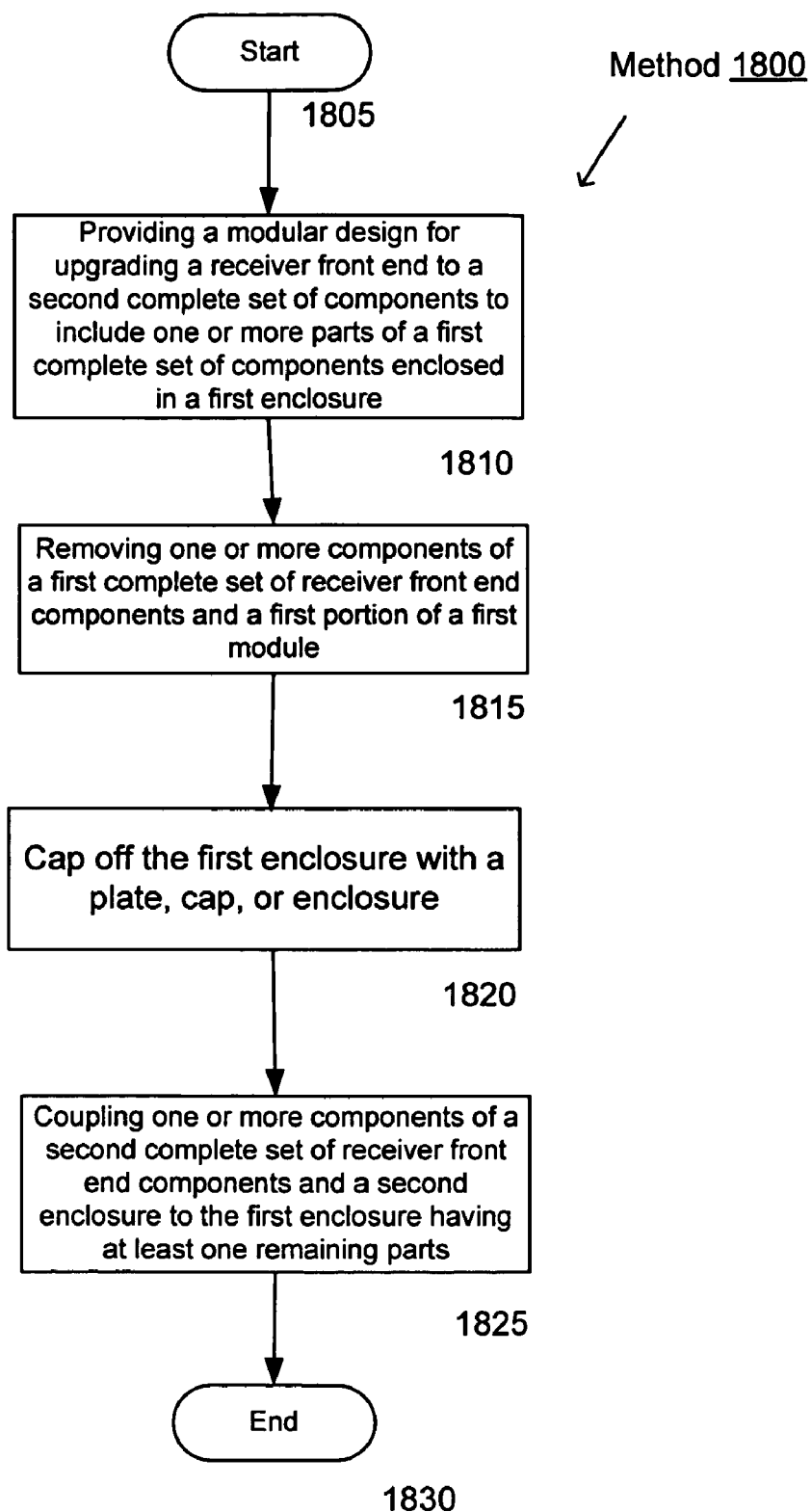
FIG. 18 is a flow chart of a method according to at least one exemplary embodiment.

A method 1800 according to at least one embodiment is shown in the flow chart of FIG. 18. Referring to FIG. 18, a method 1800 may commence at 1805 and proceed to 1810, at which a modular design may be provided for upgrading a receiver front end to a second complete set of components that includes one or more parts of a first set of components enclosed in a first enclosure. Method 1800 may then proceed to 1815, at which service personnel may remove one or more components of the first complete set of receiver front end components and a first portion of a module. One or more of the first set of components may be mounted or affixed to a first mounting, modular panel or enclosure portion.

Method 1800 may then proceed to 1820, at which service personnel may cap off the first enclosure with a plate, cap, or second enclosure. Method 1800 may then proceed to step 1825, coupling one or more components of a second complete set of receiver or transceiver front end components and a second enclosure to the first enclosure having at least one remaining parts. The second complete set of components may include different components than the first set of components. The second enclosure may include a new controller board, cooler, and dewar with one or more HTS filters inside.

Thus, the system and method of the embodiments described herein may provide a means by which a service provider may protect their capital equipment investment against latent or newly appearing electromagnetic interference that would otherwise adversely affect receiver performance. Capital equipment investment may be preserved because service providers may make use of some or nearly all the hardware already purchased for the first set of front end components. For example, in one case the enclosure or housing, seals, dual-duplexers, and some wiring may be reused during the upgrade to HTS. In some cases, the upgrade may take place on-site the service providers station location without the need to transport the equipment to a manufacturing or service location. Further, in various exemplary embodiments above the front-end receiver system is described to include a dual-duplexer, but may be also a duplexer or simplex case as indicated in other exemplary embodiments. Another variation may be a receiver front-end having a housing that has both multiple sections and a back plate for upgrading.

While embodiments of the invention have been described above, it is evident that many alternatives, modifications and variations will be apparent to those skilled in the art. Accordingly, the embodiments of the invention, as set forth above, are intended to be illustrative, and should not be construed as limitations on the scope of the invention. Various changes may be made without departing from the spirit and scope of the invention. Accordingly, the scope of the present invention should be determined not by the embodiments illustrated above, but by the claims appended hereto and their legal equivalents.

We claim:

1. A wireless communication system comprising:
a receiver front end including a housing, the front end having a first enclosure that is to be at least partially reused and that houses a first set of components and is configured so that the front end may be upgraded to further have a second enclosure that houses a second set of components, wherein the receiver front end is upgraded such that the second enclosure is added and at least one component of the second set of components is electrically coupled to at least one component of the first set of components housed by the first enclosure that preexisted prior to upgrading, and at least one electrical component of the first set of components is removed from the first enclosure and replaced by at least one electrical component of the second set of components included with the second enclosure.

2. The wireless communication system of claim 1, wherein the second enclosure is coupled to the first enclosure, the first enclosure housing at least one component of the first set of components.

3. The wireless communication system of claim 1, wherein the second set of components includes one or more cryogenically cooled components that are cooled to an HTS operating temperature(s).

4. The wireless communication system of claim 3, wherein the one or more cryogenically cooled components includes at least one cryogenically cooled amplifier.

5. The wireless communication system of claim 4, wherein the cryogenically cooled amplifier is a low noise amplifier.

6. The wireless communication system of claim 1, wherein the second set of components includes a cryogenic cooler, a heat sink, and a control board, wherein the cryogenic cooler cools to an HTS operating temperature(s).

7. The wireless communication system of claim 1, wherein the second set of components includes one or more high temperature superconductor (HTS) components.

8. The wireless communication system of claim 7, wherein the one or more high temperature superconductor components includes at least one high temperature superconductor filter.

9. The wireless communication system of claim 1, wherein the second set of components includes at least one cryogenically cooled amplifier and at least one high temperature superconductor filter cooled to an HTS operating temperature(s).

10. The wireless communication system of claim 1, wherein the first enclosure includes a back plate or section having components to be upgraded mounted thereto which has been removed for upgrade.

11. The wireless communication system of claim 10, in which the first enclosure and the first set of components includes a dual duplexer configured to provide one or more duplexed channels.

12. The wireless communication system of claim 11, in which the number of duplexed channels is six.

13. The wireless communication system of claim 1, further comprising:
a duplexer having one or more connectors and included in the first set of components; and
a backplate having one or more through holes and capping the back of the first enclosure letting the one or more connectors open to be coupled to the second enclosure.

14. The wireless communication system of claim 13, further comprising:
one or more connector(s) on the second enclosure which align with the one or more connectors of the first enclosure, wherein the one or more connector(s) of the first enclosure are connected with the one or more connectors of the second enclosure when the first enclosure is abutted with the second enclosure.

15. The wireless communication system of claim 1, wherein there are three of the first enclosure coupled to one of the second enclosure.

16. The wireless communication system of claim 15, wherein each of the three first enclosures includes two duplexers and the second enclosure includes six high temperature superconductor filters.

17. The wireless communication system of claim 1, wherein the second enclosure has one open side, and there are three of the first enclosures that are coupled to the open side of the second enclosure so as to create a single enclosure with four sections.

18. A method for upgrading a receiver or transceiver front end, comprising the steps of:
providing a modular design so that a housing enclosure and one or more parts of a first complete receiver front end system may be at least partially reused as one of the housing enclosures and parts of a second complete receiver front end system;

removing one or more sections of a first enclosure;

removing at least one electrical part of the first complete receiver front end system from the first enclosure and replacing it with at least one electrical part of the second complete receiver front end system included with a second enclosure; and coupling the second enclosure that includes upgrade components to the first enclosure.

19. The method for upgrading a receiver or transceiver front end of claim 18, further comprising the step of:

capping off the first enclosure with a plate, cap, or enclosure.

20. The method of claim 18, wherein the parts of the second complete receiver front end system includes one or more cryogenically cooled components that are cooled to an HTS operating temperature(s).

21. The method of claim 20, wherein the one or more cryogenically cooled components includes at least one cryogenically cooled amplifier or at least one cryogenically cooled filter.

* * * * *